United States Patent
Yokokawa et al.

(10) Patent No.: US 8,520,754 B2
(45) Date of Patent: Aug. 27, 2013

(54) RECEPTION APPARATUS AND METHOD, PROGRAM AND RECEPTION SYSTEM

(75) Inventors: Takashi Yokokawa, Kanagawa (JP); Satoshi Okada, Tokyo (JP); Tomoharu Honda, Tokyo (JP)

(73) Assignee: Sony Corporation, Tokyo (JP)

( * ) Notice: Subject to any disclaimer, the term of this patent is extended or adjusted under 35 U.S.C. 154(b) by 307 days.

(21) Appl. No.: 12/958,729

(22) Filed: Dec. 2, 2010

(65) Prior Publication Data

US 2011/0164706 A1  Jul. 7, 2011

(30) Foreign Application Priority Data

Jan. 6, 2010  (JP) .................................. 2010-000920

(51) Int. Cl.
*H04K 1/10* (2006.01)

(52) U.S. Cl.
USPC ........... 375/260; 375/262; 375/265; 375/267; 375/340; 375/343; 375/346; 375/347; 375/350

(58) Field of Classification Search
USPC ................. 375/260, 262, 267, 340, 343, 346, 375/347; 370/203, 204, 205, 208, 209, 210
See application file for complete search history.

(56) References Cited

U.S. PATENT DOCUMENTS

| | | |
|---|---|---|
| 2006/0168524 A1 | 7/2006 | Saeki |
| 2006/0251081 A1* | 11/2006 | Choksi ........................ 370/394 |
| 2009/0067384 A1* | 3/2009 | Himmanen et al. .......... 370/330 |

FOREIGN PATENT DOCUMENTS

EP  1 615 433 A1  1/2006

OTHER PUBLICATIONS

Digital Video Broadcating (DVB), Frame structure channel coding and modulation for second generation digital terrestrial television broadcasting system (DVB-T2), Sep. 2009, 167 pages.
Extended European Search Report issued Mar. 6, 2012 in Patent Application No. 10195140.8.

* cited by examiner

*Primary Examiner* — Dhaval Patel
(74) *Attorney, Agent, or Firm* — Oblon, Spivak, McClelland, Maier & Neustadt, L.L.P.

(57) ABSTRACT

Disclosed herein is a reception apparatus, including: a reception section adapted to receive an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams; an acquisition section adapted to acquire specification information for specifying a combination of a first frame and a second frame obtained by demodulating the received OFDM signal; and a detection section adapted to detect a combination of a packet of the common packet sequence which configures the first frame and a packet of the data packet sequence which configures the second frame, whose combination is specified based on the acquired specification information.

13 Claims, 22 Drawing Sheets

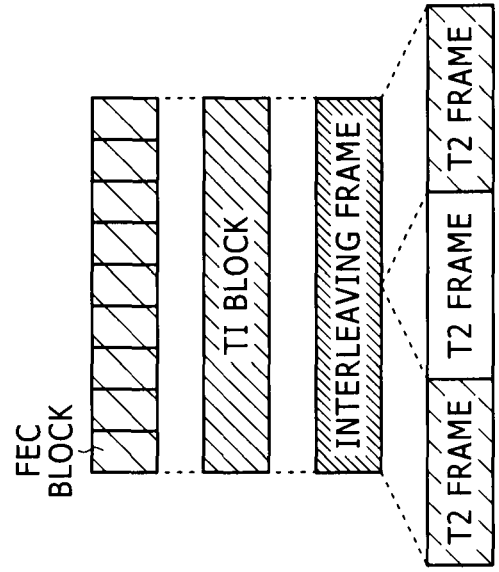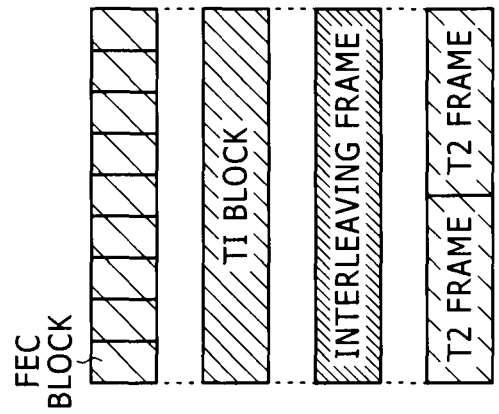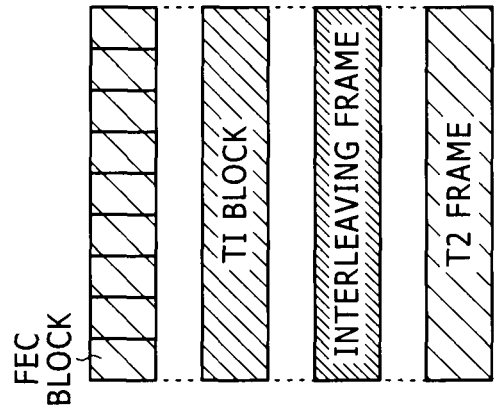

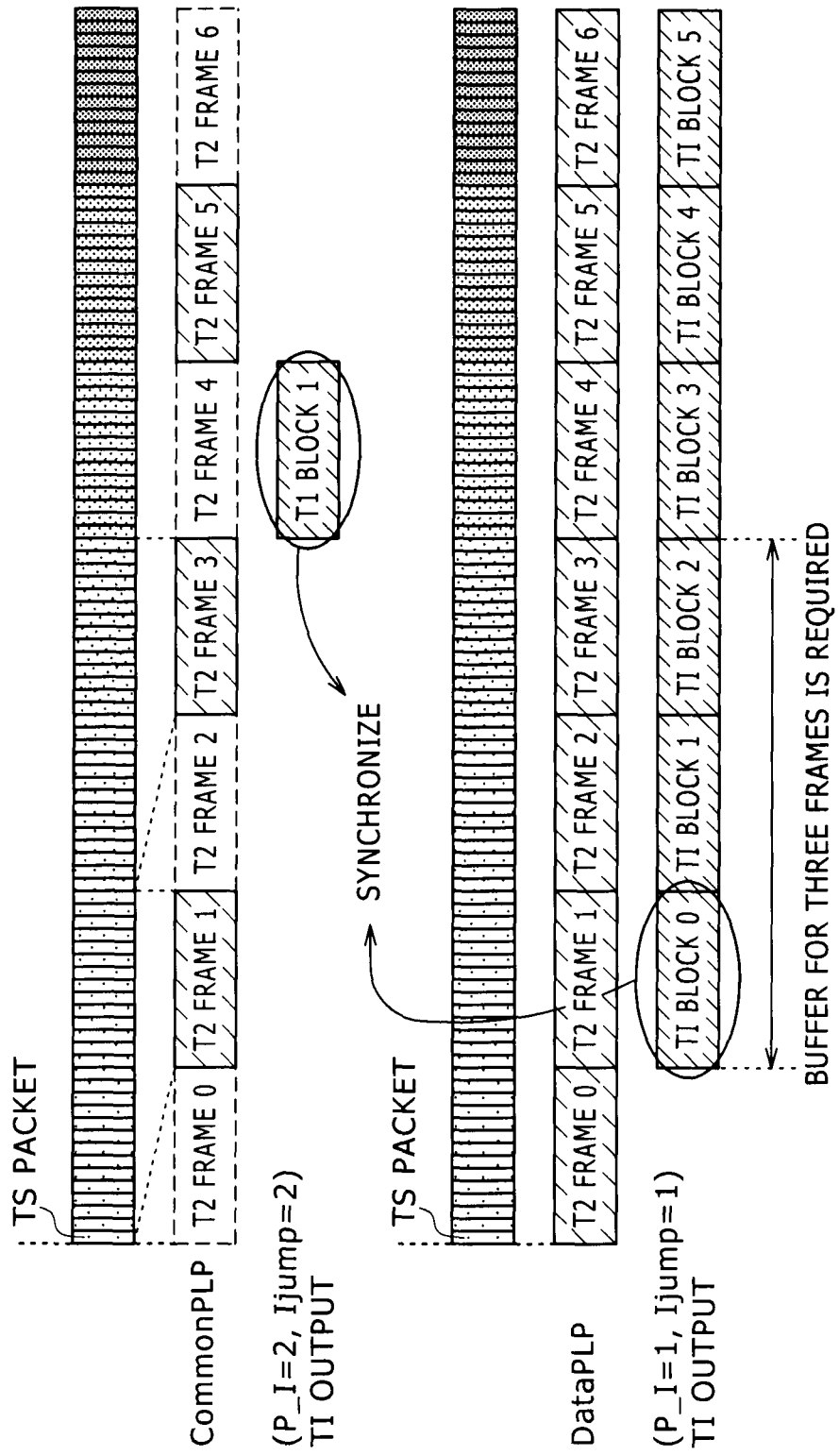

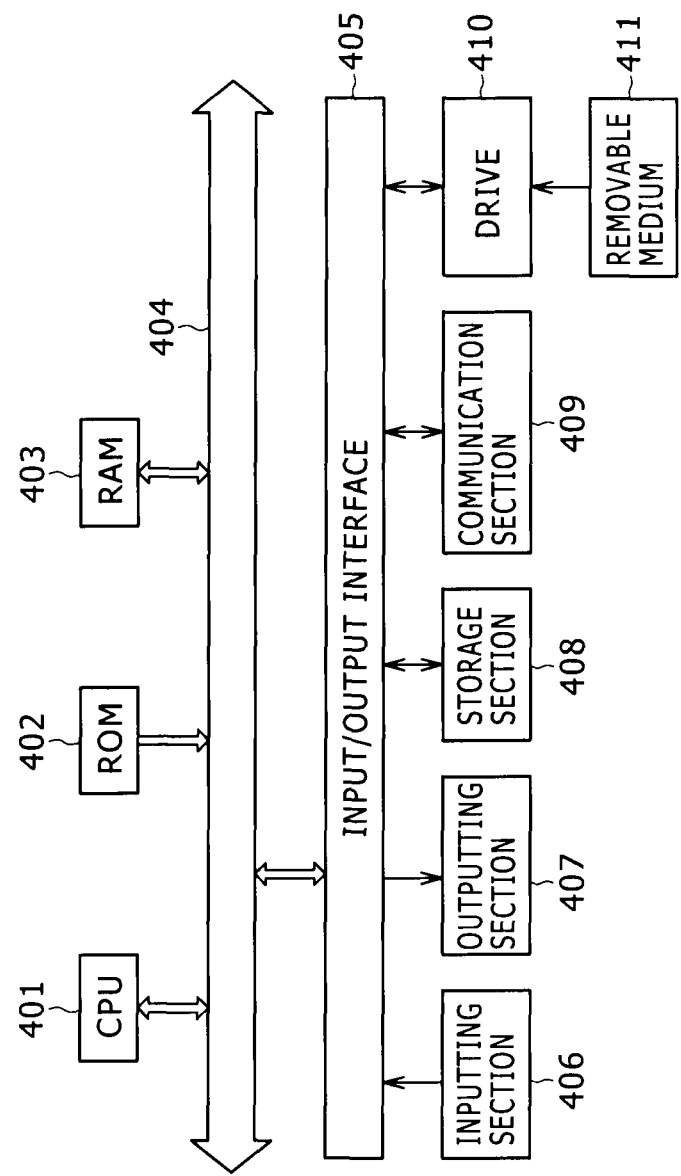

RECEPTION APPARATUS AND METHOD, PROGRAM AND RECEPTION SYSTEM

BACKGROUND OF THE INVENTION

1. Field of the Invention

This invention relates to a reception apparatus and method, a program and a reception system, and particularly to a reception apparatus and method, a program and a reception system by which synchronism can be established with certainty.

2. Description of the Related Art

In recent years, as a system for transmitting a digital signal, a modulation system called orthogonal frequency division multiplexing (OFDM) system is used. In the OFDM system, a large number of orthogonal subcarriers are prepared in a transmission band, and data are applied to the amplitude and the phase of each subcarrier to digitally modulate the data by PSK (Phase Shift Keying) or QAM (Quadrature Amplitude Modulation).

The OFDM system is frequently applied to terrestrial digital broadcasting which is influenced much by a multipath disturbance. As a standard for terrestrial digital broadcasting which adopts the OFDM system, such standards as, for example, DVB-T (Digital Video Broadcasting-Terrestrial) and ISDB-T (Integrated Services Digital Broadcasting-Terrestrial) are available.

Incidentally, DVB (Digital Video Broadcasting)-T.2 as a standard for terrestrial digital broadcasting of the next generation is being established by the ETSI (European Telecommunication Standards Institute) (refer to "Frame structure channel coding and modulation for a second generation digital terrestrial broadcasting system (VBG-T2)," DVB Document A122, June 2008.

SUMMARY OF THE INVENTION

DVB-T.2 uses a system called M-PLP (Multiple PLP (Physical Layer Pipe)). In the M-PLP system, data are transmitted using a packet sequence called Common PLP formed from a common packet extracted from a plurality of transport streams (hereinafter referred to as TSs) and a packet sequence called Data PLP formed from the TSs from which such common packets are extracted. In other words, it can be considered that the Common PLP is configured from packets common to a plurality of TSs while the Data PLP is configured from packets which are unique to the individual TSs. The reception side restores one TS from the Common PLP and the Data PLP.

Further, in DVB-T.2, data are transmitted in a unit of a T2 frame.

In order to reconstruct a TS, it is necessary to synchronize a Common PLP and a Data PLP with each other. However, since T2 frames inserted in a Common PLP and a Data PLP are not always fixed, a method of detecting in which T2 frames a Common PLP and a Data PLP are in synchronism with each other is demanded.

Thus, it is desirable to provide a reception apparatus and method, a program and a reception system by which synchronism between different packet sequences such as a Common PLP and a Data PLP can be established with certainty.

According to an embodiment of the present invention, there is provided a reception apparatus, including:

reception means for receiving an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;

acquisition means for acquiring specification information for specifying a combination of a first frame and a second frame obtained by demodulating the received OFDM signal; and detection means for detecting a combination of a packet of the common packet sequence which configures the first frame and a packet of the data packet sequence which configures the second frame, whose combination is specified based on the acquired specification information.

The specification information includes information representative of the numbers of first frames and second frames with respect to a predetermined frame which serves as a reference and information representative of a distance at which such common packet sequences are inserted in the first frame and information representative of a distance at which such data packet sequences are inserted in the second frame. The detection means specifies a first frame and a second frame which make a combination in accordance with the information representative of the numbers and the distance.

The reception apparatus further includes readout means for reading out the packets of the common packet sequence and the data packet sequence which are in synchronism each other using difference information which is a difference of the information added to the packets which configure the first frame and the second frame specified and indicative of timings at which the packets are to be read out.

The specification information includes information indicative of a frame index allocated to each of the first frame and the second frame, and the reception apparatus further includes correction means for correcting, in the case where the pieces of the information indicative of the frame indices of the first frame and the second frame are different from each other, the difference information in response to frame lengths indicative of the lengths of the first frame and the second frame.

The specification information includes information indicative of frame indices allocated to the first frame and second frame, and the reception apparatus further includes correction means for correcting, in the case where the pieces of the information indicative of the frame indices of the first frame and the second frame are different from each other and a third frame having a structure different from that of the first frame and the second frame is inserted, the difference information in response to a first frame length indicative of the length of the first frame and the second frame, a second frame length indicative of the length of the third frame, and a distance at which the third frames are disposed.

The common packet sequence and the data packet sequence are Common PLP (Physical Layer Pipe)s and Data PLP (Physical Layer Pipe)s, respectively, produced from a plurality of streams in accordance with the M-PLP (Multiple PLP (Physical Layer Pipe)) system of DVB-T (Digital Video Broadcasting-Terrestrial).2.

According to the embodiment of the present invention, there is provided a reception method, including the steps of:

receiving an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;

acquiring specification information for specifying a combination of a first frame and a second frame obtained by demodulating the received OFDM signal; and detecting a combination of a packet of the common packet sequence which configures the first frame and a packet of the data packet sequence which configures the second frame, whose combination is specified based on the acquired specification information.

According to an embodiment of the present invention, there is provided a program for causing a computer to function as:

reception means for receiving an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;

acquisition means for acquiring specification information for specifying a combination of a first frame and a second frame obtained by demodulating the received OFDM signal; and detection means for detecting a combination of a packet of the common packet sequence which configures the first frame and a packet of the data packet sequence which configures the second frame, whose combination is specified based on the acquired specification information.

According to the embodiment of the present invention, there is provided a reception apparatus including reception means for receiving an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams, acquisition means for acquiring specification information for specifying a combination of a first frame and a second frame obtained by demodulating the received OFDM signal, and detection means for detecting a combination of a packet of the common packet sequence which configures the first frame and a packet of the data packet sequence which configures the second frame, whose combination is specified based on the acquired specification information.

According to another embodiment of the present invention, there is provided a reception system, including:

first acquisition means for acquiring, through a transmission line, an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams; and a transmission line decoding processing section adapted to carry out a transmission line decoding process including at least a decoding process of the packet sequences for the OFDM signal acquired through the transmission line;

the transmission line decoding processing section including second acquisition means for acquiring specification information for specifying a combination of the first frame and the second frame obtained by demodulating the OFDM signal acquired through the transmission line, and detection means for detecting a combination of a packet of the common packet sequence which configures the first frame and a packet of the data packet sequence which configures the second frame, whose combination is specified based on the acquired specification information.

According to further embodiment of the present invention, there is provided a reception system, including:

a transmission line decoding processing section adapted to carry out a transmission line decoding process including at least a decoding process of packet sequences for an OFDM (Orthogonal Frequency Division Multiplexing) signal acquired through a transmission line and obtained by modulating a first frame configured so as to include packets of a common packet sequence configured from a packet common to a plurality of streams and a second frame configured so as to include packets of a data packet sequence configured from packets individually unique to the plural streams; and an information source decoding processing section adapted to carry out, for the signal for which the transmission line decoding process is carried out, an information source decoding process including at least a process of decompressing compressed information into original information;

the transmission line decoding processing section including acquisition means for acquiring specification information for specifying a combination of the first frame and the second frame obtained by demodulating the OFDM signal acquired through the transmission line, and detection means for detecting a combination of a packet of the common packet sequence which configures the first frame and a packet of the data packet sequence which configures the second frame, whose combination is specified based on the acquired specification information.

According to still further embodiment of the present invention, there is provided a reception system, including:

a transmission line decoding processing section adapted to carry out a transmission line decoding process including at least a decoding process of packet sequences for an OFDM (Orthogonal Frequency Division Multiplexing) signal acquired through a transmission line and obtained by modulating a first frame configured so as to include packets of a common packet sequence configured from a packet common to a plurality of streams and a second frame configured so as to include packets of a data packet sequence configured from packets individually unique to the plural streams; and an outputting section adapted to output an image or sound based on the signal for which the transmission line decoding process is carried out;

the transmission line decoding processing section including acquisition means for acquiring specification information for specifying a combination of the first frame and the second frame obtained by demodulating the OFDM signal acquired through the transmission line, and detection means for detecting a combination of a packet of the common packet sequence which configures the first frame and a packet of the data packet sequence which configures the second frame, whose combination is specified based on the acquired specification information.

According to still further embodiment of the present invention, there is provided A reception system, including:

a transmission line decoding processing section adapted to carry out a transmission line decoding process including at least a decoding process of packet sequences for an OFDM (Orthogonal Frequency Division Multiplexing) signal acquired through a transmission line and obtained by modulating a first frame configured so as to include packets of a common packet sequence configured from a packet common to a plurality of streams and a second frame configured so as to include packets of a data packet sequence configured from packets individually unique to the plural streams; and a recording section adapted to record the signal for which the transmission line decoding process is carried out;

the transmission line decoding processing section including acquisition means for acquiring specification information for specifying a combination of the first frame and the second frame obtained by demodulating the OFDM signal acquired through the transmission line, and detection means for detecting a combination of a packet of the common packet sequence which configures the first frame and a packet of the data packet sequence which configures the second frame, whose combination is specified based on the acquired specification information.

In the reception systems, specification information obtained by demodulating an OFDM signal acquired through a transmission line and used to specify a combination of a first frame configured so as to include packets of a common packet sequence configured from a packet common to a plurality of streams and a second frame configured so as to include packets of a data packet sequence configured from packets individually unique to the plural streams is acquired. Then, a combination of a packet of the common packet sequence which configures the first frame and a packet of the data packet sequence which configures the second frame, whose combination is specified based on the acquired specification information is detected.

The reception apparatus may be an independent apparatus or an internal block which composes one apparatus.

The program can be provided by transmission thereof through a transmission medium or in the form of a recording medium in or on which it is recorded.

In summary, according to the present invention, re-establishment of synchronism can be carried out with certainty.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 12A to 12C are diagrammatic views illustrating an example of a configuration of a T2 frame;

FIG. 13 is a diagrammatic view illustrating a method of synchronization in a case where compensation delay is invalid;

FIG. 22 is a block diagram showing an example of a hardware configuration of a computer.

DETAILED DESCRIPTION OF THE PREFERRED EMBODIMENTS

In the following, preferred embodiments of the present invention are described with reference to the accompanying drawings.
Outline of the General Configuration FIG. 1 shows an outline of a configuration of a transmitter (Tx) and a receiver (Rx) in the case where the M-PLP system is used in DVB-T.2.

Figure 1:
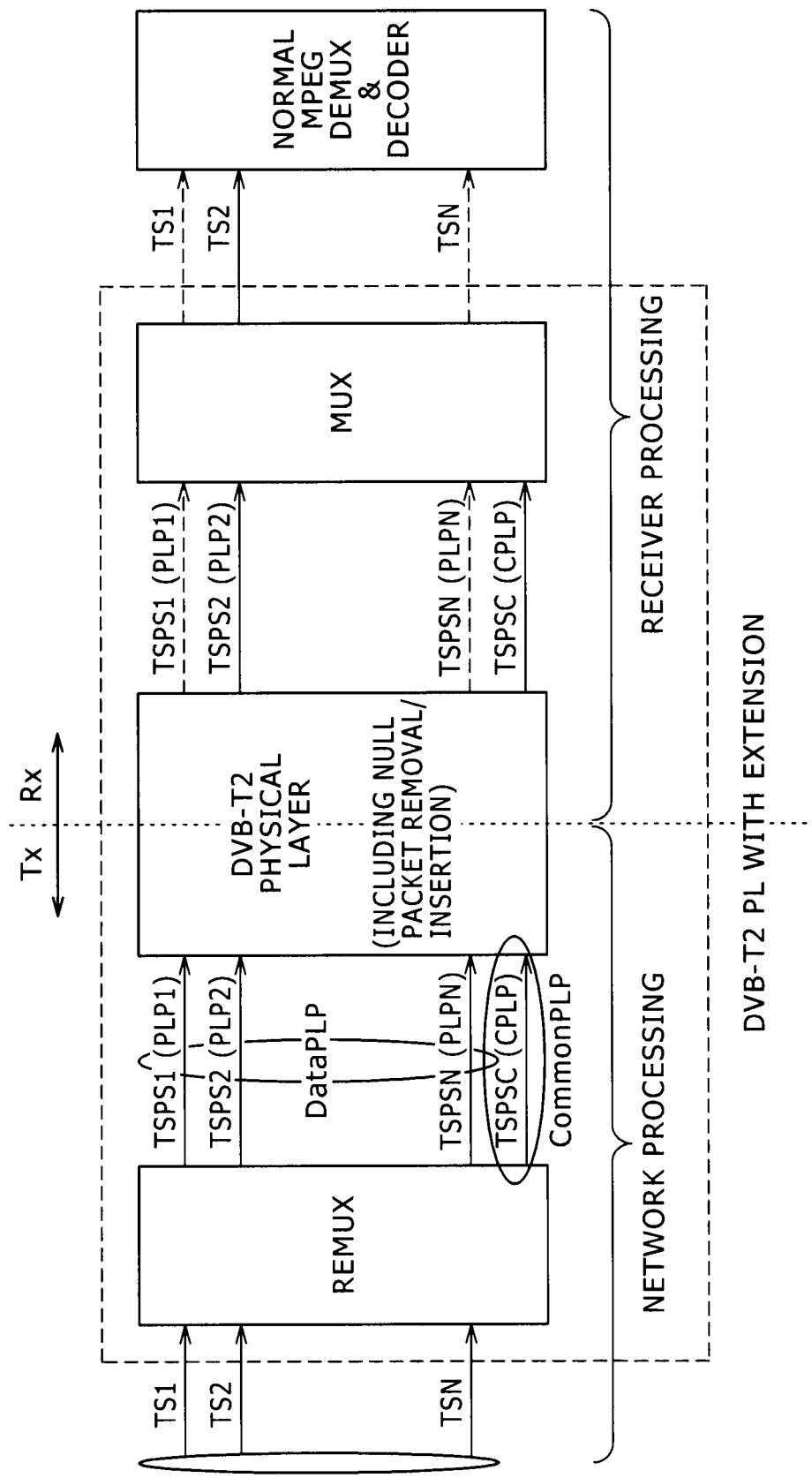
FIG. 1 is a block diagram showing a general configuration of a transmitter and a receiver where the M-PLP method is used in DVB-T.2.

Referring to FIG. 1, the transmitter side operates in the following manner. In particular, when a plurality of TSs such as TSs TS1 to TSN in FIG. 1 are inputted at a fixed bit rate, common packets are extracted from packets which configure the TSs to produce a packet sequence (TSPSC (CPLP) in FIG. 1) which is called Common PLP. Further, the TSs from which the common packets are extracted called Data PLPs such as packet sequences TSPS1 (PLP1) to TSPSN (PLPN).

In particular, on the transmitter side, N Data PLPs and one Common PLP are produced from N TSs. Consequently, an encoding ratio in error correction and a modulation system such as the OFDM system can be applied adaptively to each PLP. It is to be noted that, in the case where the term PLP is used solely in the description of the present embodiment, it includes both of the Common PLP and a Data PLP. Further, in the case where the term Common PLP and the term Data PLP are used, they include significance of individual packets which configure the Common PLP and the Data PLP.

For example, in the case of a TS (Transport Stream) packet of MPEG, some of a plurality of Data PLPs include the same information like control information such as an SDT (Service Description Table) or an EIT (Event Information Table) or the like. By cutting out and transmitting such common information as a Common PLP, drop of the transmission efficiency can be prevented.

On the other hand, the receiver side demodulates a plurality of Data PLPs (TSPS1 (PLP1) to TSPSN (PLPN) in FIG. 1) and Common PLP (TSPSC(CPLP) in FIG. 1) received thereby using a demodulation system such as the OFDM system. Then, the receiver side extracts only a desired PLP (TSPS2 (PLP2) in FIG. 1) and carries out an error correction process for the PLP. By this, a desired TS can be reconstructed.

For example, if the Data PLP TSPS2 (PLP2) is selected from among the Data PLPs TSPS1 (PLP1) to TSPSN (PLPN) as seen in FIG. 1, then the TS TS2 is reconstructed using the Data PLP TSPS2 (PLP2) and the Common PLP TSPSC (CPLP). Therefore, if one Data PLP and the common PLP are extracted, then the TS can be reconstructed, and consequently, there is such a merit that the operation efficiency of the receiver is improved.

Then, the TS reconstructed by the receiver side is outputted to a decoder on the succeeding stage. The decoder applies, for example, MPEG decoding to decode coded data included in the TS and outputs data of an image or sound obtained as a result of the MPEG decoding.

As described above, if the M-PLP system is used in DVB-T.2, then on the transmitter Tx side, N Data PLPs and one Common PLP are produced from N TSs and transmitted. On the receiver Rx side, a desired TS is reconstructed or reproduced from a desired Data PLP and the one Common PLP.

Example of the Configuration of the Reception Apparatus

Figure 2:
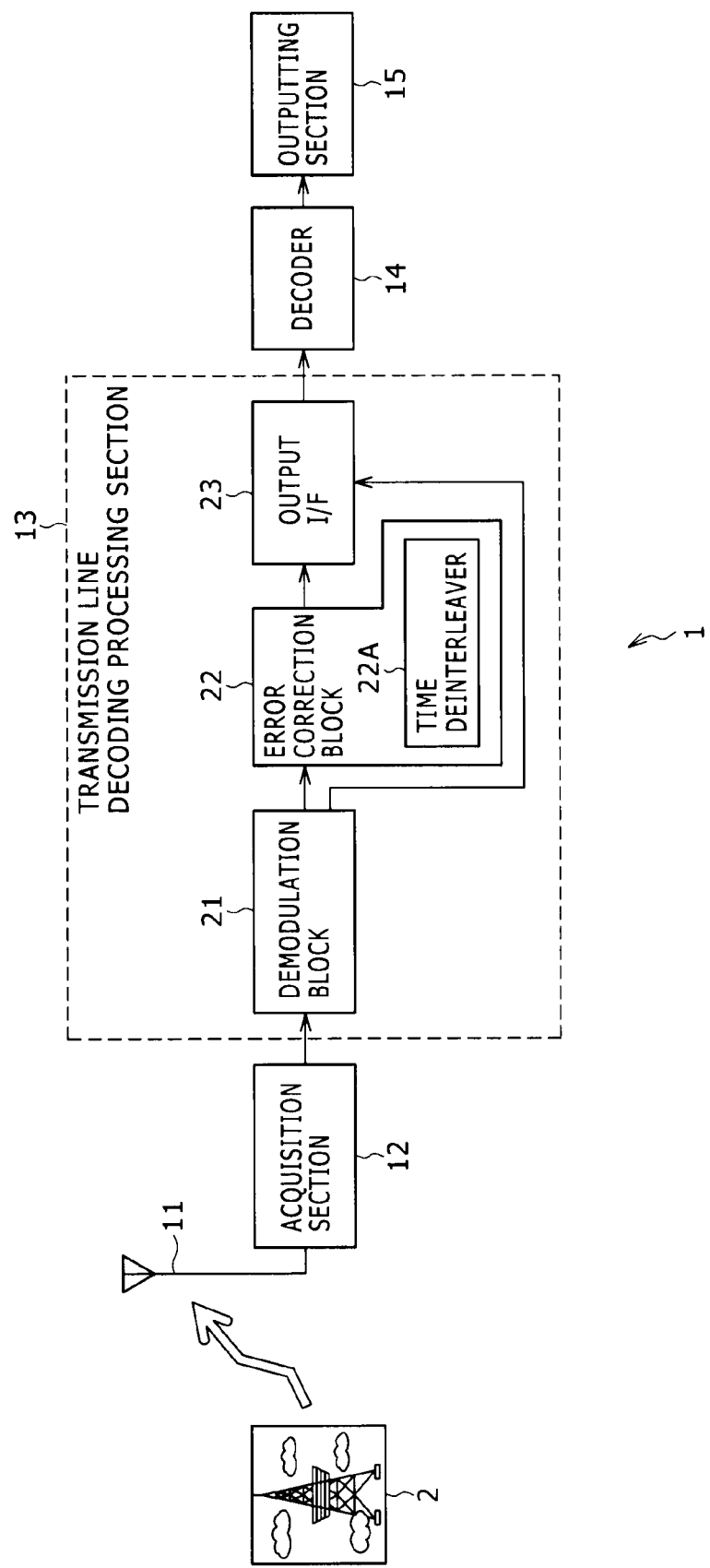
FIG. 2 is a block diagram showing a configuration of a reception apparatus to which the present invention is applied.

FIG. 2 shows a configuration of a reception apparatus to which the present invention is applied.

It is to be noted that, in FIG. 2, the reception apparatus 1 corresponds to the receiver Rx shown in FIG. 1, and a transmission apparatus 2 corresponds to the transmitter Tx shown in FIG. 1.

The reception apparatus 1 of FIG. 2 receives a signal of digital broadcasting transmitted thereto from the transmission apparatus 2. This signal is an OFDM signal which is obtained by applying such processes as error correction and OFDM modulation to PLPs from TSs using the M-PLP system adopted as standards for terrestrial digital broadcasting of the next generation in DVB-T.2 which is being currently set.

In particular, the transmission apparatus 2, for example, in a broadcasting station transmits an OFDM signal of digital broadcasting through a transmission line. The reception apparatus 1 receives the OFDM signal transmitted thereto from the transmission apparatus 2, carries out a transmission line decoding process including a decoding process and an error correction process, and outputs decoded data obtained by the transmission line decoding process to the succeeding stage.

Referring to FIG. 2, the reception apparatus 1 includes an antenna 11, an acquisition section 12, a transmission line decoding processing section 13, a decoder 14 and an outputting section 15.

The antenna 11 receives the OFDM signal transmitted thereto from the transmission apparatus 2 through the transmission line and supplies the received OFDM signal to the acquisition section 12.

The acquisition section 12 is configured, for example, from a tuner, a set top box (STB) or the like, and carries out frequency conversion to convert the OFDM signal in the form of a RF signal received by the antenna 11 into an IF (Intermediate Frequency) signal. The acquisition section 12 supplies the IF signal to the transmission line decoding processing section 13.

The transmission line decoding processing section 13 carries out necessary processes such as demodulation and error correction for the OFDM signal from the acquisition section 12, reconstructs a TS from PLPs obtained by the processes and supplies the TS to the decoder 14.

The transmission line decoding processing section 13 includes a demodulation block 21, an error correction block 22 and an output interface (I/F) 23.

The demodulation block 21 carries out a demodulation process for the OFDM signal from the acquisition section 12 and outputs desired Data PLPs and one Common PLP obtained as a decoded signal by the demodulation process to the error correction block 22.

Further, the demodulation block 21 acquires information for specifying frames which are in synchronism each other (such information is hereinafter referred to as specification information) and information for correcting synchronism (such information is hereinafter referred to as correction information) by the demodulation process. Then, the demodulation block 21 supplies the acquired information to the output I/F 23.

The specification information acquired by the demodulation process includes the number P_I of T2 frames per one interleaving frame and an interval Ijump at which pertaining PLPs are inserted in a T2 frame.

Meanwhile, the correction information acquired by the demodulation process includes information regarding a T2 frame and information regarding an FEF (Future Extension Frame). The information regarding a T2 frame is, for example, T2_frame_length representative of a length of a T2 frame and represented in a unit of T [us]. Meanwhile, the FEF is a frame having a structure which is different from that of the T2 frame and will be determined in future. The information regarding the FEF is, for example, FEF_length which represents a length of the FEF and whose unit is T [us], and FEF_interval which represents an interval at which FEFs are disposed.

In particular, each of the T2 frame and the FEF has a preamble signal called P1, and the preamble signal includes information for discrimination of whether a target frame is a T2 frame or an FEF and information required for processing of an OFDM signal such as demodulation. The T2 frame includes another preamble signal called P2 in addition to the preamble signal P1. The preamble signal P2 includes, in addition to information necessary for a demodulation process of the T2 frame, specification information such as the T2 frame number P_I and the interval Ijump and correction information such as the T2 frame length T2_frame_length or the FEF length FEF_length and the FEF interval FEF_interval.

Accordingly, if T2 frames and FEFs are multiplexed, then the demodulation block 21 detects the preamble signal P2 from a T2 frame, acquires specification information and correction information included in the preamble signal P2 and supplies the acquired information to the output I/F 23. It is to be noted that, although there are instances where FEFs are not multiplexed, in this instance, the correction information does not include information regarding an FEF.

The error correction block 22 includes a time deinterleaver 22A.

The time deinterleaver 22A carries out a time deinterleaving process when T2 frames configured in such a manner as to include TS packets of a PLP which is a demodulation signal obtained from the demodulation block 21 are accumulated until they correspond to a TI Block. The TI Block (Time Interleaving Block) is a processing unit when a time deinterleaving process is carried out.

The error correction block 22 carries out a predetermined error correction process for a PLP for which the time deinterleaving process is carried out and outputs a PLP obtained as a result of the error correction process to the output I/F 23. In particular, each PLP to be outputted from the error correction block 22 is outputted in a unit of a TI Block (such output is hereinafter referred to also as TI output). Further, upon such TI outputting, a frame index F_i allocated to each T2 frame of a PLP is outputted in response to the corresponding T2 frame.

It is to be noted here that, by the transmission apparatus 2, for example, data of an image and sound as a broadcasting program are encoded by MPEG (Moving Picture Experts Group) encoding, and PLPs produced from a TS configured from TS packets in which the MPEG encoded data are included are transmitted as an OFDM signal. Also, by the transmission apparatus 2, PLPs are encoded into codes such as, for example, RS (Reed Solomon) codes or LDPC (Low Density Parity Check) codes as a countermeasure against errors which may appear on the transmission line. Accordingly, the error correction block 22 carries out a process of decoding the codes as an error correction encoding process.

The output I/F 23 reconstructs a TS from the PLPs supplied thereto from the error correction block 22 and carries out an outputting process of outputting the reconstructed TS at a predetermined fixed rate (hereinafter referred to as TS rate) to the outside. It is to be noted that details of the configuration of the output I/F 23 are hereinafter described with reference to FIG. 3.

The decoder 14 carries out MPEG decoding of the coded data included in the TS supplied thereto from the output I/F 23 and supplies data of an image and sound obtained by the MPEG decoding to the outputting section 15.

The outputting section 15 is configured, for example, from a display unit and a speaker, and displays an image and outputs sound based on the data of an image and sound supplied thereto from the decoder 14.

The reception apparatus 1 is configured in such a manner as described above.

Detailed Example of the Configuration of the Output I/F

Figure 3:
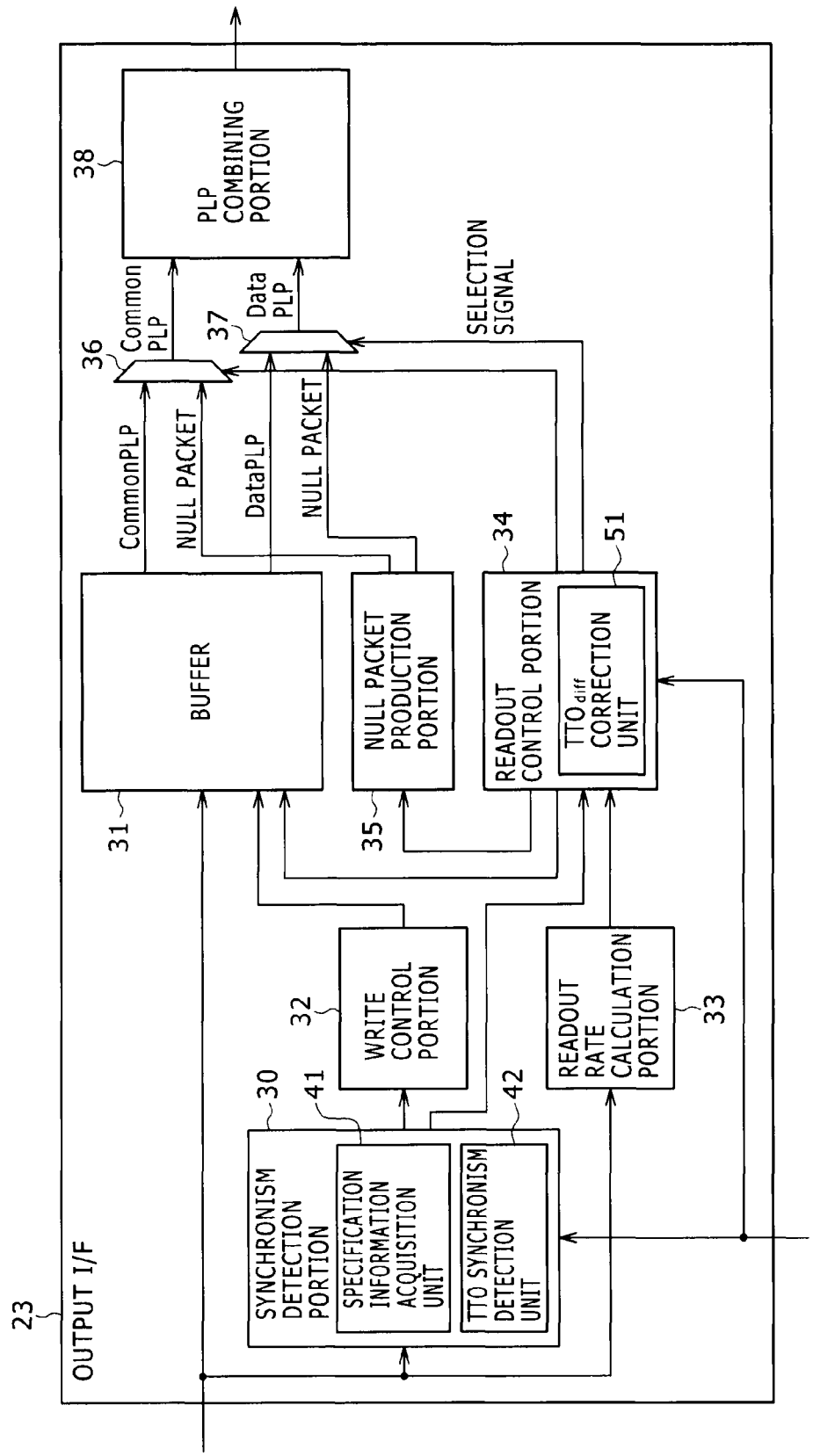
FIG. 3 is a block diagram showing an example of a configuration of an output I/F shown in FIG. 2.

FIG. 3 shows an example of a configuration of the output I/F 23 shown in FIG. 2.

Referring to FIG. 3, the output I/F 23 includes a synchronism detection portion 30, a buffer 31, a write control portion 32, a readout rate calculation portion 33, a readout control portion 34, a Null packet production portion 35, a selector 36, another selector 37 and a PLP combining portion 38.

PLPs supplied from the error correction block 22, that is, a common PLP and Data PLPs, are supplied to the synchronism detection portion 30, buffer 31 and readout rate calculation portion 33. Meanwhile, of the information supplied from the demodulation block 21, the specification information is supplied to the synchronism detection portion 30 and the correction information is supplied to the readout control portion 34.

To each of the Common PLP and the Data PLPs, information, that is, signaling values, called DNP (Deleted Null Packet) and ISSY (Input Stream Synchronizer), is added in a unit of a TS packet.

ISSY includes information of ISCR (Input Stream Time Reference), BUFS (Buffer Size), TTO (Time to Output) and so forth. ISCR is information indicative of a timestamp added on the transmission apparatus 2 side upon transmission of each TS packet. BUFS is information representative of a required buffer amount of the PLP. If this information is referred to, then the reception apparatus 1 can settle a buffer region. TTO is information representative of a period of time until a TS packet is outputted from the top of a P_I symbol placed in a TS frame in which processing for the TS packet is carried out.

Meanwhile, DNP is information which is added when the output I/F 23 operates in a mode called Null packet deletion mode hereinafter described, and successive Null packets are transmitted with a signal of one byte formed from the number of successive Null packets. For example, in the case where DNP=3, an original packet sequence can be reconstructed while it is determined that three Null packets appear successively in the reception apparatus 1.

The synchronism detection portion 30 detects synchronism of a TTO which is one of input stream synchronizers, that is, ISSYs, added to a TS packet of a PLP. In order to detect synchronism of TTOs, the synchronism detection portion 30 includes a specification information acquisition unit 41 and a TTO synchronism detection unit 42.

The specification information acquisition unit 41 acquires a T2 frame number P_I and an interval Ijump from the demodulation block 21 and a frame index F_i from the error correction block 22 as specification information and supplies the specification information to the TTO synchronism detection unit 42.

The TTO synchronism detection unit 42 specifies a combination of T2 frames which are in synchronism with each other from among combinations of T2 frames configured so as to include TS packets of PLPs based on the specification information (P_I, Ijump, and F_i) acquired by the specification information acquisition unit 41. The TTO synchronism detection unit 42 detects synchronism of a Common PLP and a Data PLP, that is, a combination of TS packets, by detecting that the TTOs added to the TS packets in the T2 frames of the specified combination are in synchronism with each other.

In other words, a TTO added to a TS packet is basically placed only at the top of a T2 frame, and it can be regarded that, if T2 frames are in synchronism with each other, then the TTOs added to TS packets in the T2 frames are in synchronism with each other. Therefore, it is considered that the TTO synchronism detection unit 42 detects such a pair of TTOs.

A result of the detection is supplied to the readout control portion 34. Also, the information regarding the PLPs acquired by the TTO synchronism detection unit 42 is supplied to the write control portion 32.

The buffer 31 successively accumulates the PLPs supplied thereto from the error correction block 22 under the writing control of the write control portion 32. Further, the buffer 31 supplies the Common PLPs from among the PLPs accumulated therein to the selector 36 and supplies the Data PLPs to the selector 37 under the reading control of the readout control portion 34.

The write control portion 32 carries out writing address control to the buffer 31 based on the information regarding the PLPs supplied thereto from the synchronism detection portion 30 to accumulate the PLPs into the buffer 31.

The readout rate calculation portion 33 calculates a TS rate based on the PLPs supplied thereto from the error correction block 22 and supplies the calculated TS rate $R_{TS}$ to the readout control portion 34. Details of the calculation process of the TS rate $R_{TS}$ carried out by the readout rate calculation portion 33 are hereinafter described with reference to FIG. 10.

The readout control portion 34 carries out address control of the buffer 31 so that a TS reconstructed from the PLPs read out from the buffer 31 may be outputted in accordance with the TS rate supplied thereto from the readout rate calculation portion 33.

In particular, the readout control portion 34 reads out the TTOs added to the TS packets which configure the T2 frames which are in a synchronous state with each other in accordance with the detection result of TTO synchronism supplied thereto from the synchronism detection portion 30 and determines the difference $TTO_{diff}$ between the TTOs. Since this difference $TTO_{diff}$ corresponds to the displacement amount between the readout timings of the PS packets of the Common PLP and the Data PLP, if the readout control portion 34 displaces the readout timing of the TS packet in response to the difference $TTO_{diff}$, then the TS packets of the Common PLP and the Data PLP which are in synchronism with each other are read out and supplied to the PLP combining portion

38. It is to be noted that the difference $TTO_{diff}$ may be determined by the write control portion 32 and supplied to the readout control portion 34 upon writing of the TS packets.

Further, at this time, since a DNP is sometimes added to the TS packets, the readout control portion 34 controls the selectors 36 and 37 so that a number of Null packets corresponding to the value of the DNP may be supplied to the PLP combining portion 38.

The Null packet production portion 35 produces and supplies Null packets to the selectors 36 and 37 under the control of the readout control portion 34.

The readout control portion 34 includes a $TTO_{diff}$ correction unit 51. When the frame indices F_i of T2 frames of a Common PLP and a Data PLP which are in synchronism with each other are different from each other or when T2 frames and FEFs are multiplexed with each other, the $TTO_{diff}$ correction unit 51 uses correction information supplied thereto from the demodulation block 21 to correct the TTO difference $TTO_{diff}$. In this instance, the readout control portion 34 uses the TTO difference $TTO_{diff}$ corrected by the $TTO_{diff}$ correction unit 51 to read out a TS packet.

Details of the readout control process of TS packets carried out by the readout control portion 34 are hereinafter described with reference to FIGS. 12 and 17.

The selector 36 selects one of a TS packet of a Common PLP from the buffer 31 and a Null packet from the Null packet production portion 35 in response to a selection signal from the readout control portion 34. In this instance, if a DNP is added to the TS packet of the Common PLP, then Null packets corresponding to the value of the DNP are supplied to the PLP combining portion 38. Similarly, the selector 37 selects one of a TS packet of a Data PLP and a Null packet and supplies the selected packet to the PLP combining portion 38.

To the PLP combining portion 38, a Common PLP supplied from the selector 36 and a Data PLP supplied from the selector 37 are inputted in synchronism with each other. The PLP combining portion 38 combines the PLPs to reconstruct a TS and supplies the TS at the TS rate to the decoder 14.

The output I/F 23 is configured in such a manner as described above.

Processing of the Transmission Apparatus

Now, details of transmission and reception processes carried out between the reception apparatus 1 and the transmission apparatus 2 are described with reference to FIGS. 4 to 17. Here, processing carried out by the transmission apparatus 2 is described first with reference to FIGS. 4 to 6, and then processing carried out by the reception apparatus 1 is described with reference to FIGS. 7 to 17.

It is to be noted that, in the description of the transmission and reception processes given below, it is assumed for simplified description that four TSs TS1 to TS4 are inputted to the transmission apparatus 2 and PLPs produced from the TSs are subjected to such processes as error correction and OFDM modulation and then transmitted to the reception apparatus 1.

Figure 4:
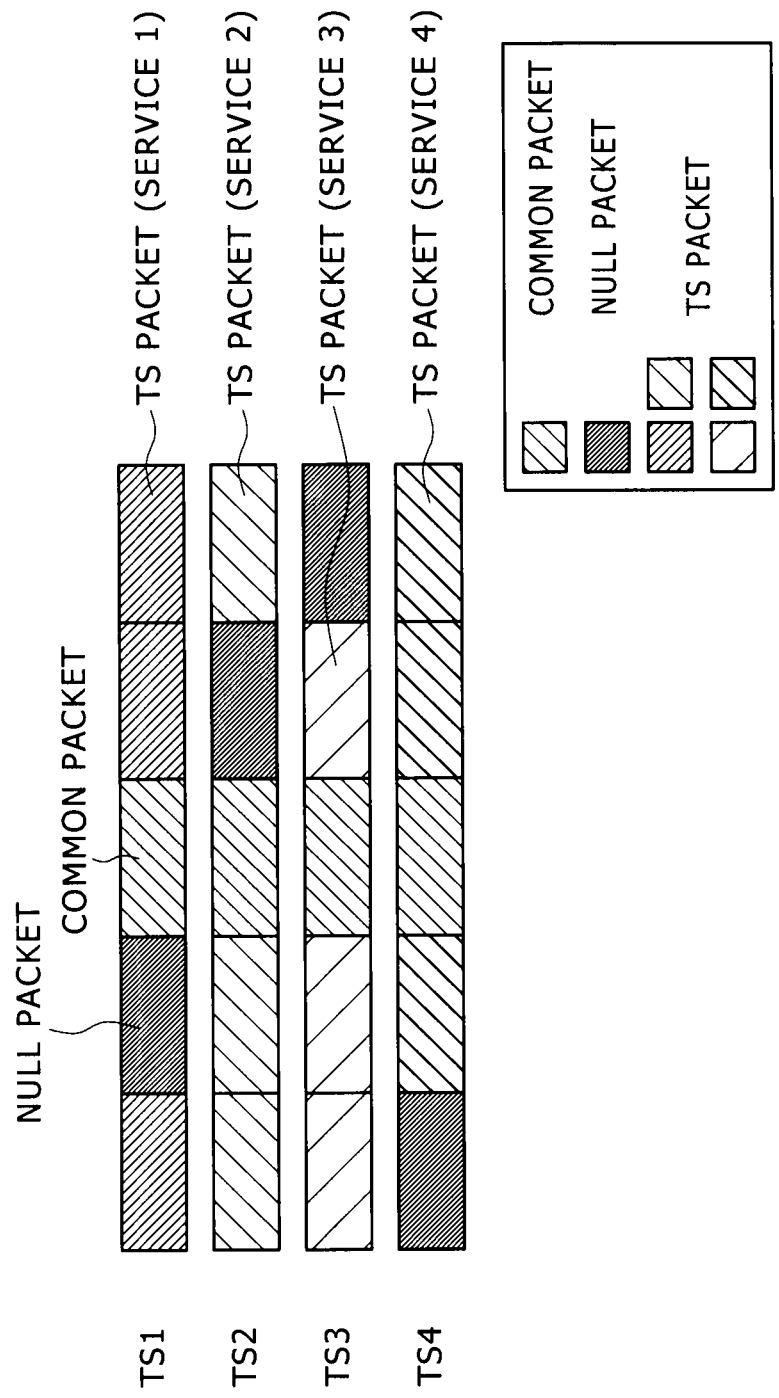
FIG. 4 is a diagrammatic view illustrating a configuration of packets on the transmission side.

Referring first to FIG. 4, five rectangles of each of the TSs TS1 to TS4 individually represent packets. In the present embodiments, the packets which configure each TS are classified into three different packets including a TS packet, a Null packet and a common packet.

The TS packet contains data for proving various services, which are, in FIG. 4, services 1 to 4, such as, for example, MPEG encode data. Meanwhile, the Null packet contains data for adjustment which are transmitted in order to keep the amount information, which is to be outputted from the transmission side, fixed when the transmission side has no data to be transmitted. For example, the Null packet prescribed in MPEG is a TS packet which has 0x47, 0x1F, 0xFF and 0x1F as four bytes at the top thereof, and all 1s are adopted for the bits of the payload.

The common packet contains data which are common to a plurality of TSs. For example, in the case of MPEG, control information such as the SDT and the EIT described hereinabove corresponds to the common packet.

In particular, in the example of FIG. 4, the third packet from the left in the figure from among the five packets which configure each of the TSs TS1 to TS4 is a common packet. Since the common packets contain the same information, they are extracted as a common PLP as seen in FIG. 5.

Figure 5:
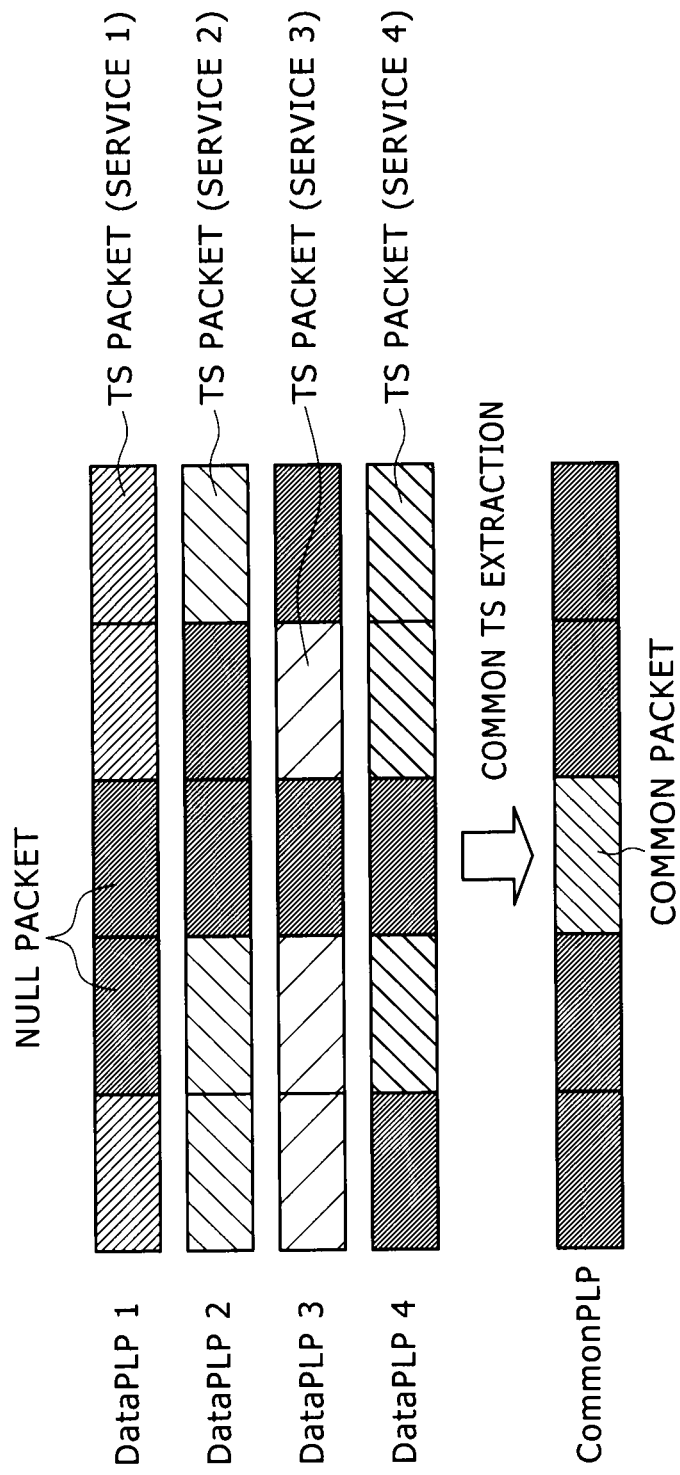
FIG. 5 is a similar view but illustrating a configuration of a Common PLP and a Data PLP on the transmission side.

In particular, if the TSs TS1 to TS4 of FIG. 4 contain a common packet, then the common packet is extracted as the Common PLP as seen in FIG. 5, and the extracted common packets are replaced by Null packets. Then, each of the TSs from which the common packet is extracted makes a sequence called Data PLP, that is, one of sequences Data PLP1 to Data PLP4.

In the case where the transmission apparatus 2 is operating in a mode called Null packet deletion mode, a Null packet is transmitted in the form of a signal (signaling) of 1 byte called DNP.

Figure 6:
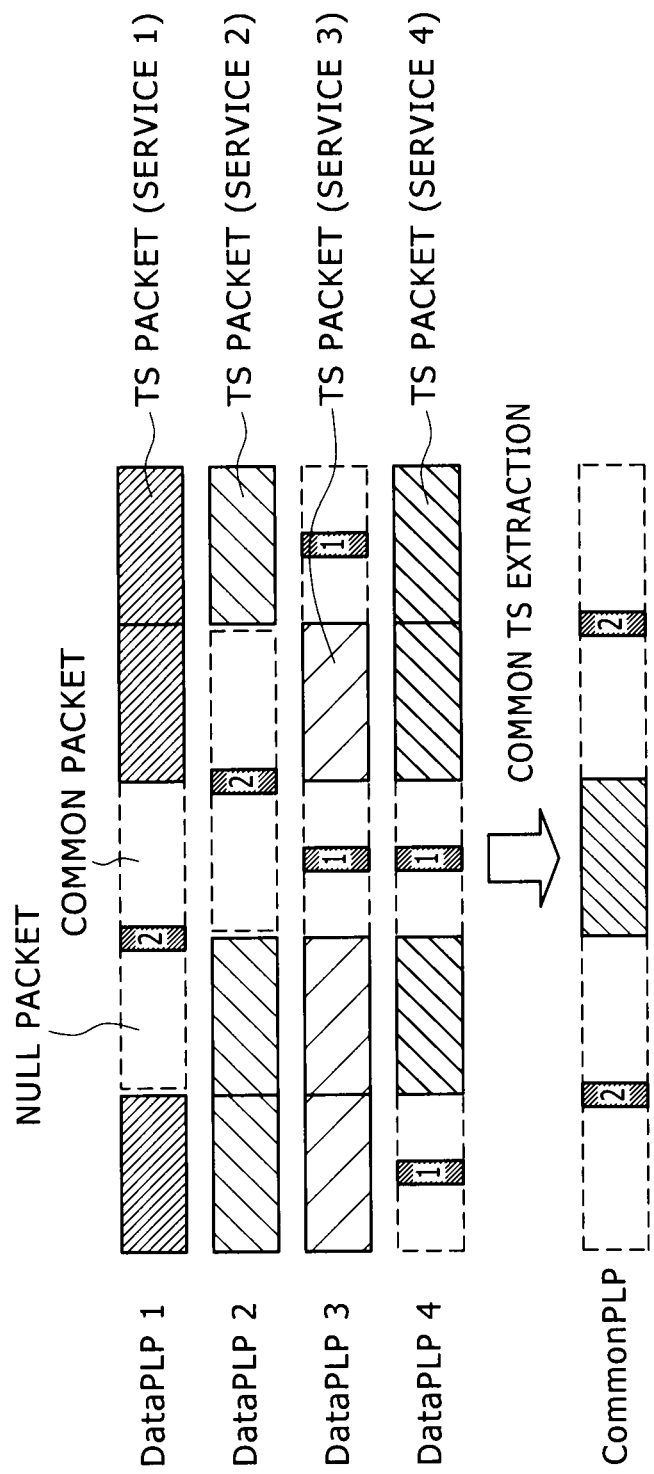
FIG. 6 is a similar view but illustrating a configuration of a Common PLP and a Data PLP in a Null packet deletion mode on the transmission side.

For example, in the sequence Data PLP1 illustrated in FIG. 5, the second and third packets from the left in the figure are Null packets, and in the case where two Null packets successively appear, they are replaced by a signal of 1 byte which has the value of 2 as seen in FIG. 6. In other words, the value of the DNP corresponds to the number of successively appearing Null packets. For example, in the sequence Data PLP3 shown in FIG. 5, since each of the third and fifth packets from the left in FIG. 5 is a Null packet by itself, each of them is replaced by a signal of 1 byte having the value of 1 as seen in FIG. 6.

If each Null packet is replaced by the DNP of 1 byte, then the sequences Data PLP1 to Data PLP4 and the common PLP illustrated in FIG. 5 come to have such a state as illustrated in FIG. 6. Consequently, the transmission apparatus 2 produces the sequences Data PLP1 to Data PLP4 and the common PLP.

In this manner, the transmission apparatus 2 produces four Data PLPs and one Common PLP from four TSs and carries out predetermined processes such as error correction and OFDM modulation for the produced signals. Then, the OFDM signal obtained by the predetermined processes is transmitted to the reception apparatus 1 through a predetermined transmission line.

Processing of the Reception Apparatus

Now, processing of the reception apparatus 1 is described with reference to FIGS. 7 to 17.

It is to be noted that it is assumed that an OFDM signal received by the reception apparatus 1 has been subjected to such processes as error correction and OFDM modulation in regard to the sequences Data PLP1 to Data PLP4 and the Common PLP of FIG. 6 in accordance with the processes of the transmission apparatus 2.

Figure 7:
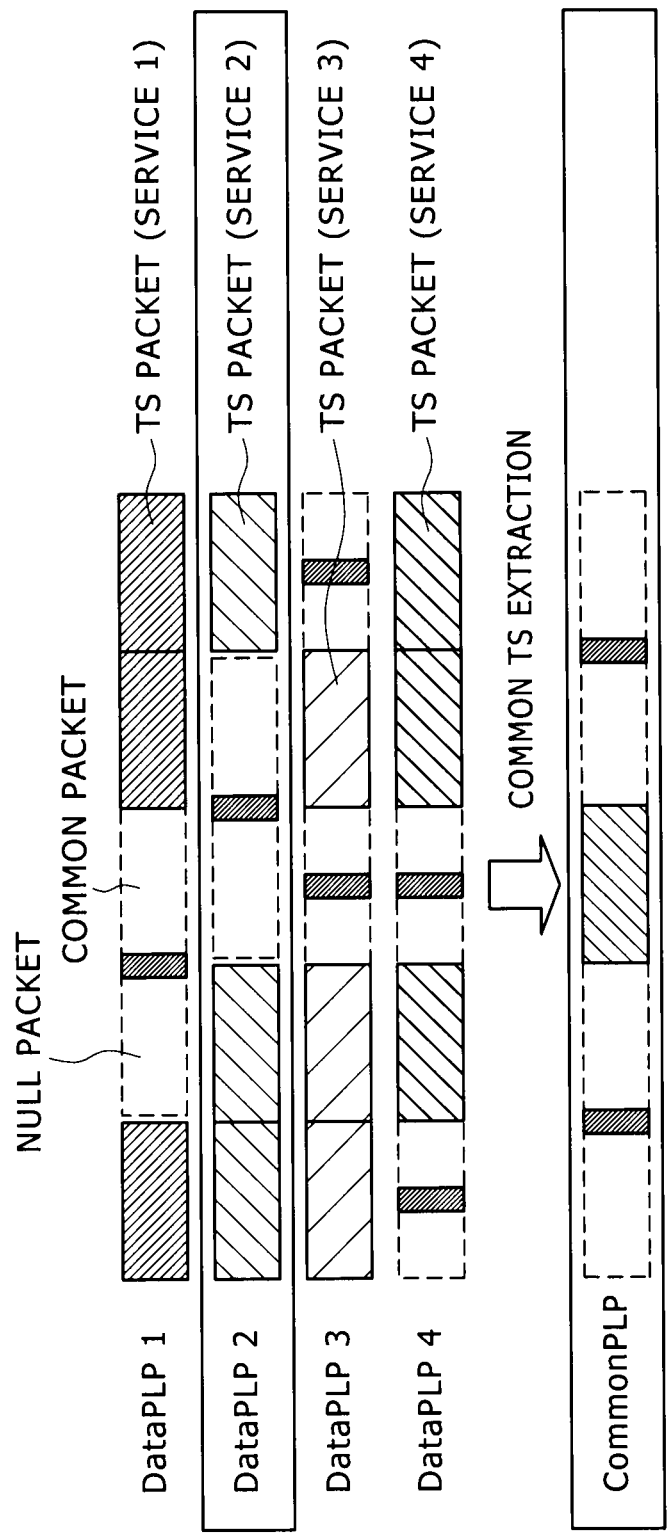
FIG. 7 is a similar view but illustrating a configuration of a Common PLP and a Data PLP on the reception side.

The reception apparatus 1 receives an OFDM signal transmitted thereto from the transmission apparatus 2 through the predetermined transmission line, and the demodulation block 21 carries out predetermined processing such as OFDM demodulation for the OFDM signal to acquire sequences Data PLP1 to Data PLP4 and a Common PLP illustrated in FIG. 7 corresponding to the sequences Data PLP1 to Data PLP4 and the Common PLP illustrated in FIG. 6, respectively. Then, for example, if the service 2 is selected by a user operation, then the sequence Data PLP2 from among the sequences Data PLP1 to Data PLP4 is extracted. The extracted sequence Data PLP2 and the Common PLP are subjected to predetermined processes such as error correction by the error correction block 22 and inputted to the output I/F 23.

Figure 8:
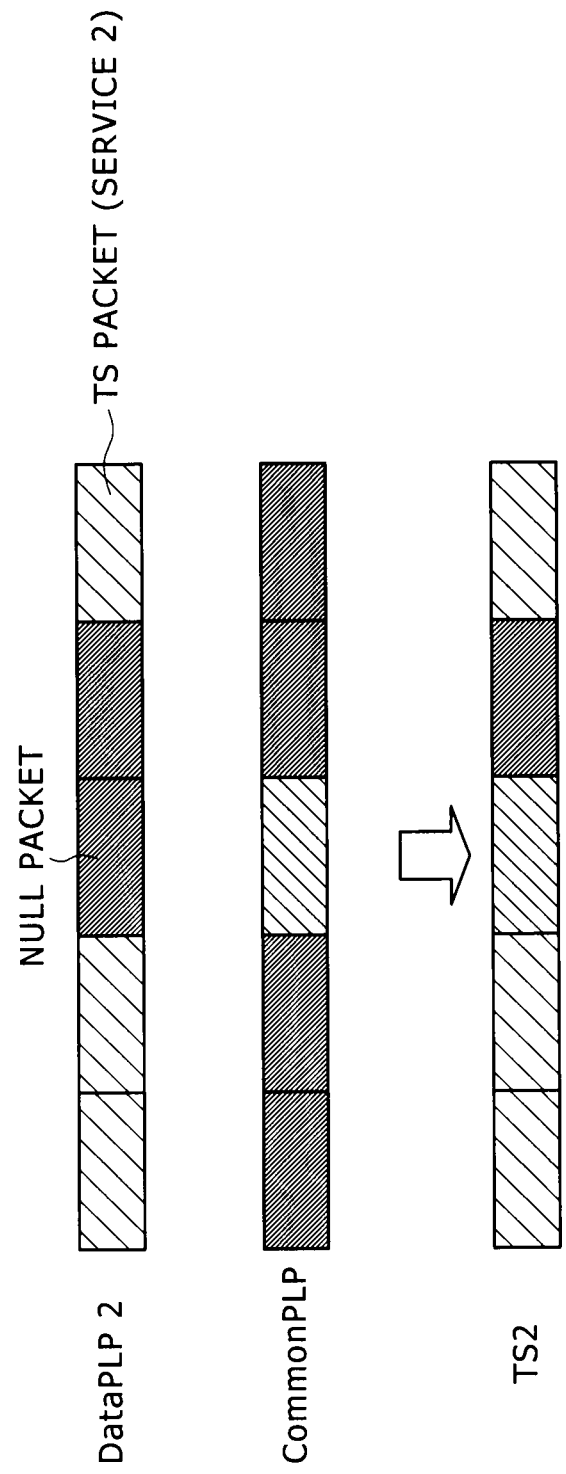
FIG. 8 is a diagrammatic view illustrating a reconstruction method of a TS on the reception side.

In particular, only the sequence Data PLP2 and the Common PLP corresponding to the sequence Data PLP2 which are individually surrounded by thick frameworks in FIG. 7 are inputted to the output I/F 23. Then, the output I/F 23 processes the sequence Data PLP2 and the Common PLP inputted thereto such that a Null packet included in the sequence Data PLP2 is replaced by the common packet included in the corresponding Common PLP. Consequently, the original TS TS2 similar to the TS TS2 illustrated in FIG. 4 is reconstructed as shown in FIG. 8.

Figure 9:
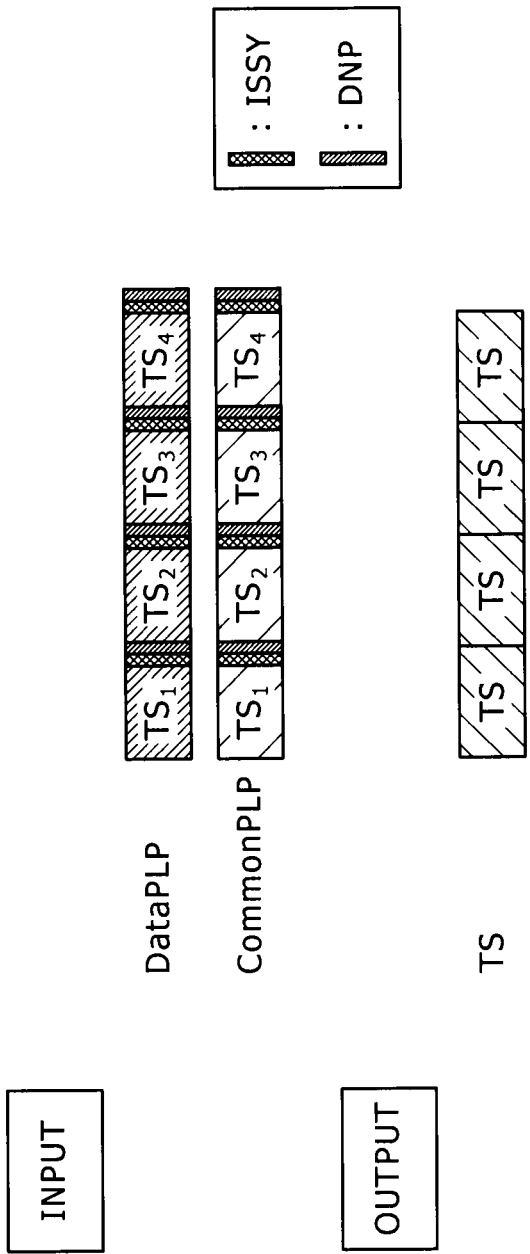
FIG. 9 is a diagrammatic view illustrating details of the reconstruction method of a TS on the reception side.

FIG. 9 illustrates details of a desired Data PLP, particularly the sequence Data PLP2, and a Common PLP inputted to the output I/F 23 and a TS outputted from the output I/F 23.

Referring to FIG. 9, the Data PLP and the Common PLP inputted to the output I/F 23 have a DNP and information called ISSY (information such as the ISCR, BUFS, TTO and so forth) added thereto in a unit of a TS packet as described hereinabove.

The output I/F 23 uses such information as just mentioned obtained from the PLPs to detect a combination of two packets synchronized with each other from within the Data PLP and the Common PLP and adjusts the timings of the Data PLP and the Common PLP to synchronize them with each other.

In particular, the readout rate calculation portion 33 in the output I/F 23 uses the DNP added to the Data PLP to reconstruct the original packet sequence from the Data PLP and reads the ISCR added to the TS packet. Consequently, the readout rate calculation portion 33 can determine the rate at which the TS is to be outputted, that is, the TS rate, from the following expression (1):

$$\text{Rate} = \frac{\text{N\_bits} \times (\text{N\_packets} + \Sigma DNP)}{(\text{ISCR\_b} - \text{ISCR\_a}) \times T} \quad (1)$$

where N_bits is the bit number per one packet, and, for example, 1504 (bits/packet) is substituted into N_bits. Meanwhile, T is the unit of an elementary period, and, for example, in the case of the 8 MHz band, such a value as 7/64 us is substituted into T.

Figures 10A, 10B:
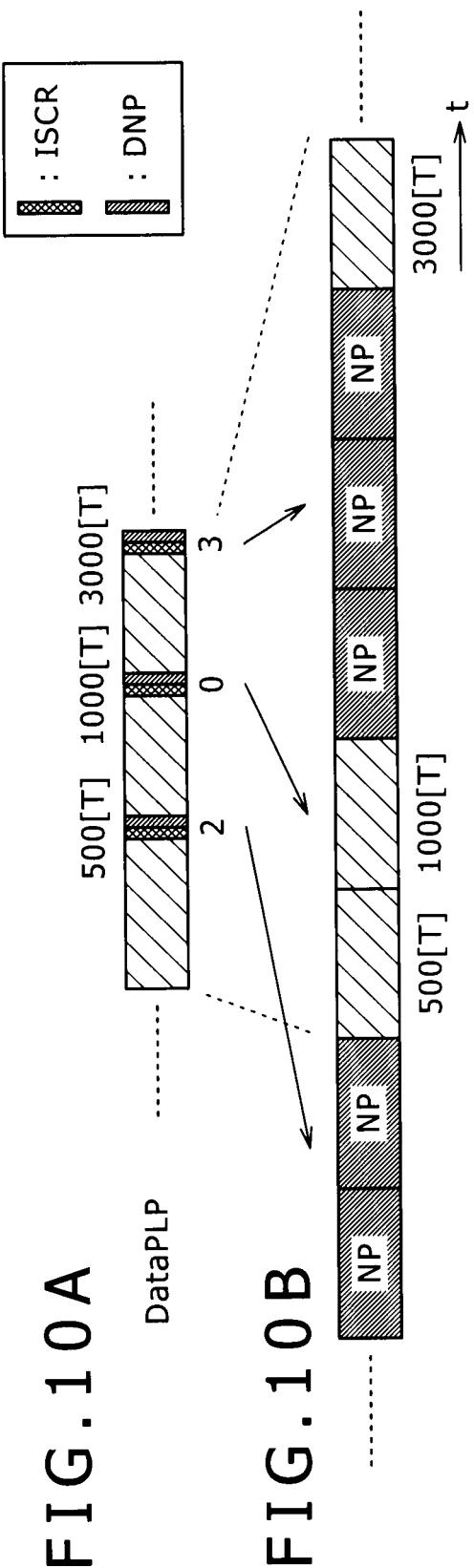
FIGS. 10A and 10B are diagrammatic views illustrating a calculation method of a TS rate.

FIGS. 10A and 10B illustrate an example of calculation of a TS rate executed by the readout rate calculation portion 33. It is to be noted that, in FIGS. 10A and 10B, the time advances from the left toward the right as indicated by an arrow mark on the bottom of FIG. 10B.

As seen in FIG. 10A, TS packets and DNPs and ISCRs which are added to the individual TS packets are inputted as a Data PLP to the readout rate calculation portion 33. In the case of the present example, the DNP added to the first TS packet from the right in FIG. 10A indicates 3, and the ISCR indicates 3000 [T]. Similarly, the DNP of the second TS packet indicates 0 and the ISCR indicates 1000 [T], and the DNP of the third TS packet indicates 2 and the ISCR indicates 500 [T].

If the DNPs mentioned are used to place Null packets into the original state, then the Data PLP of FIG. 10A is converted into such a stream as seen in FIG. 10B. Referring to FIG. 10B, in the stream illustrated, three Null packets denoted by NP in FIG. 10B are placed next to the first TS packet and followed by the second and third TS packets, which are in turn followed by two Null packets.

Here, if the packet rate which is a period of time per one packet is represented by $P_{ts}$, then the packet rate $P_{ts}$ is determined in accordance with the following expression (2):

$$PacketRate = \frac{\text{ISCR\_b} - \text{ISCR\_a}}{\text{N\_packets} + \Sigma DNP} \quad (2)$$

Accordingly, in the case of the present example, $P_{ts}$=(ISCR_b−ISCR_a)/(N_packets+ΣDNP)=(3000 [T]−500 [T])/5 [packets]=500 [T/packet].

Then, if the TS rate is represented by $R_{TS}$, then the TS rate $R_{TS}$ is determined from the expression (1) given hereinabove and the packet rate $P_{ts}$ described above in the following manner:

$R_{TS}$=N_bits/$P_{ts}$×T=1504 [bits/packet]/500 [T/packet]×7/64 [us]=27.5 [Mbps]

The TS rate $R_{TS}$ (=27.5 [Mbps]) calculated in this manner are supplied to the readout control portion 34.

Now, details of operation of the write control portion 32 and the readout control portion 34 into and from the buffer 31 are described with reference to FIG. 11.

Figure 11:
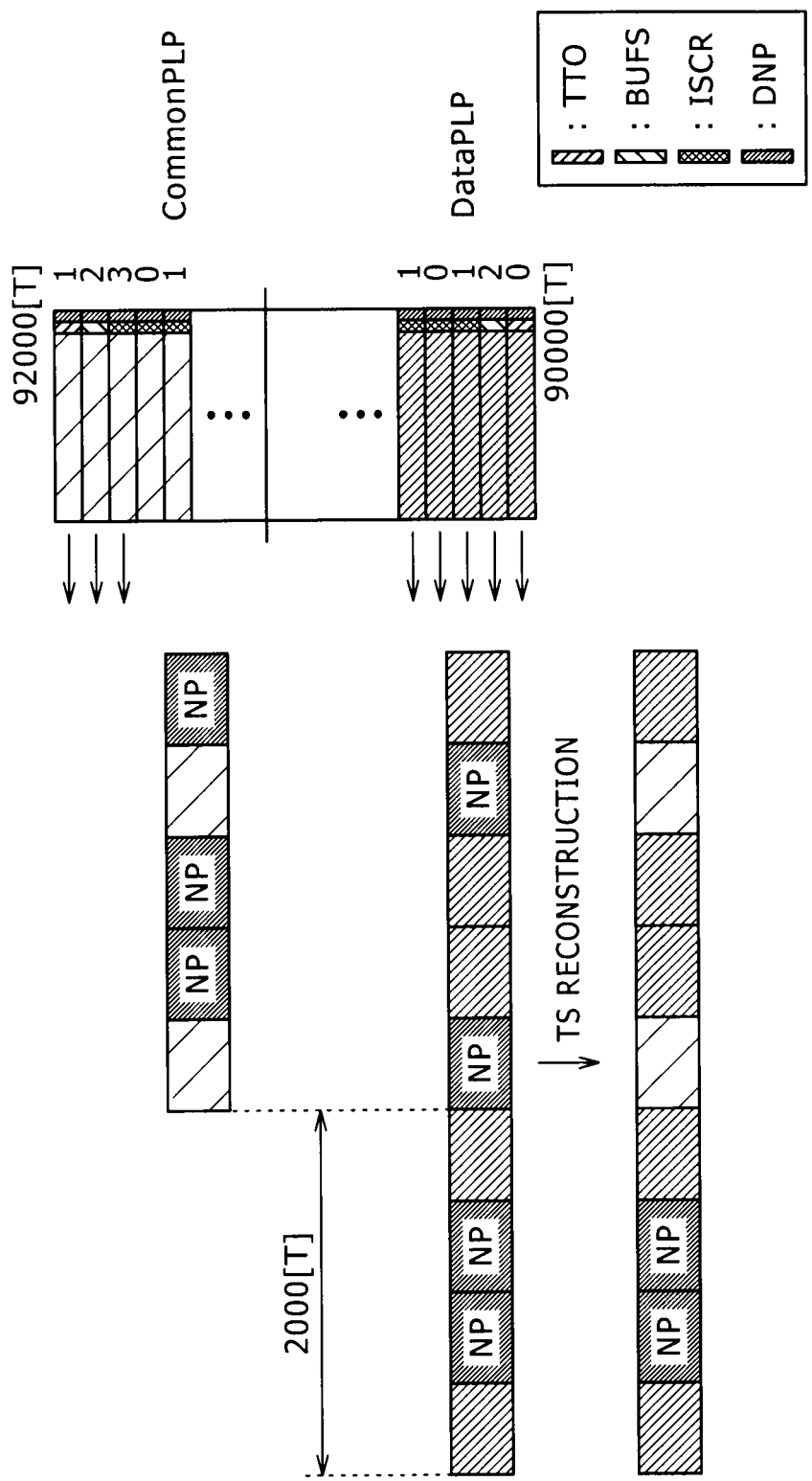
FIG. 11 is a diagrammatic view illustrating writing and readout timings of a buffer.

FIG. 11 illustrates timings of writing into and reading out from the buffer 31.

In the example of FIG. 11, a manner in which PLPs are successively accumulated into the buffer 31 is illustrated schematically. In this schematic view, a manner in which Common PLPs are successively accumulated from above to below in FIG. 11 is illustrated in an upper side region of FIG. 11 while a manner in which Data PLPs are successively accumulated from below to above in FIG. 11 is illustrated in a lower side region of FIG. 11.

In particular, in the example of FIG. 11, Common PLPs inputted to the output I/F 23 are successively stored into the buffer 31 under the control of the write control portion 32 such that five common packets (TS packets) illustrated in FIG. 11 are stored into a predetermined region on the upper side in FIG. 11 together with the ISSYs and the DNPs added thereto. As regards the ISSYs and the DNPs added to the common packets, in the example illustrated in FIG. 11, TTO=92000 [T] and DNP=1 are placed in the first common packet while BUFS and DNP=2 are placed in the second common packet. Further, in the third to fifth common packets, the DNP=3, 0, 1 are placed together with the ISCR, respectively.

Meanwhile, the inputted Data PLPs are successively stored into the buffer 31 under the control of the write control portion 32 such that five TS packets illustrated in FIG. 11 are stored into a predetermined region on the lower side in FIG. 11 together with the ISSYs and the DNPs added thereto. As regards the ISSYs and the DNPs added to the TS packets, TTO=90000 [T] and DNP=0 are placed in the first TS packet while BUFS and DNP=2 are placed in the second common packet. Meanwhile, in the third to fifth TS packets, DNP=1, 0, 1 are placed together with the ISCRs. It is to be noted that, while no particular value is described for BUFS and ISCR in the example of FIG. 11, actually predetermined values are allocated to the ISSYs similarly to the TTOs.

The Common PLPs and the Data PLPs are stored in such a manner as described above into the buffer 31. Then, the Common PLPs and the Data PLPs stored in the buffer 31 are read out under the control of the readout control portion 34. In the case of the example of FIG. 11, the TS packet at the top of the Data PLPs is read out later by 90000 [T] than the top of the P1 symbol using the value of the TTO, and the common packet at the top of the Common PLPs is read out later by 92000 [T] than the top of the P1 symbol, that is, after lapse of 2000 [T] after the TS packet at the top of the Data PLPs is read out.

In particular, while the readout control portion 34 reads out both of the Common PLPs and the Data PLPs from the buffer 31, it adjusts the output timings of the Common PLPs and the Data PLPs using the difference $TTO_{\textit{diff}}$. Then, if the readout control portion 34 detects a combination of a Common PLP and a Data PLP whose readout timings are synchronized with each other from the read out PLPs, then it replaces a Null packet placed in the Data PLP with the common packet of the Common PLP to reconstruct the original TS.

Synchronization based on a TTO ($TTO_{\textit{diff}}$) which indicates a readout timing of a packet is carried out to reconstruct a TS in such a manner as described above. Incidentally, in the case where, when synchronism between a Common PLP and a Data PLP is to be established, T2 frames inserted in a PLP vary such as in the case where a plurality of T2 frames configure an interleaving frame or in the case where a pertaining PLP is inserted in only one of a plurality of T2 frames, if the synchronization method described hereinabove with reference to FIG. 11 is merely used, then synchronism cannot be established in some cases. Therefore, a method of detecting in which T2 frame a Common PLP and a Data PLP are in synchronism with each other in such a case as just described is described.

FIGS. 12A to 12C illustrate examples of a configuration of a T2 frame.

Particularly, FIG. 12A illustrates a configuration of a T2 frame in the case where the T2 frame number P_I=1 and the interval Ijump=1.

Since P_I=1 in the configuration of FIG. 12A, one interleaving frame is configured from one T2 frame. Further, since the interval Ijump=1, a pertaining PLP is inserted into each T2 frame. In this instance, since the unit of a T2 frame and the unit of a TI block formed from a plurality of FEC Blocks are same as each other, at a stage at which inputting of one T2 frame is completed, a time deinterleaving process by the time deinterleaver 22A is carried out and TI outputting is carried out.

FIG. 12B illustrates a configuration of a T2 frame in the case where the T2 frame number P_I=2 and the interval Ijump=1.

In the configuration of FIG. 12B, since the T2 frame number P_I=2, one interleaving frame is configured from two T2 frames, and since the interval Ijump=1, a pertaining PLP is inserted into each of the T2 frames. In this instance, since two T2 frames make a unit of a TI block, at a stage at which inputting of two successive T2 frames is completed, a time deinterleaving process is carried out and TI outputting is carried out.

FIG. 12C illustrates a configuration of a T2 frame in the case where the T2 frame number P_I=2 and the interval Ijump=2.

In the configuration of FIG. 12C, since the T2 frame number P_I=2, one interleaving frame is configured from two T2 frames, and since the interval Ijump=2, a pertaining PLP is inserted jumping one T2 frame. In this instance, since the two T2 frames which configure the interleaving frame do not appear successively, at a stage at which inputting of the two T2 frames inputted intermittently is completed, a time deinterleaving process is carried out and TI outputting is carried out.

It is to be noted that the configurations of the T2 frame shown in FIGS. 12A to 12C are mere examples, and the values of the T2 frame number P_I and the interval Ijump can be set arbitrarily.

Such combinations of the T2 frame number P_I and the interval Ijump, that is, of the specification information, as described above are used to establish synchronism between a T2 frame configured so as to include a TS packet of a Common PLP and a T2 frame configured so as to include a TS packet of a Data PLP as described hereinabove.

Incidentally, data to be transmitted from the transmission apparatus 2, that is, an OFDM signal, is transmitted by a method called compensation delay method. According to the compensation delay method, the transmission timing of one of data is delayed by the transmission apparatus 2 side so that the timings of reception by the reception apparatus 1 side may become same as each other. Here, in order to facilitate description, a case in which the compensation delay is invalid is described first with reference to FIG. 13, and then another case in which the compensation delay is valid is described with reference to FIG. 14.

Figure 14:
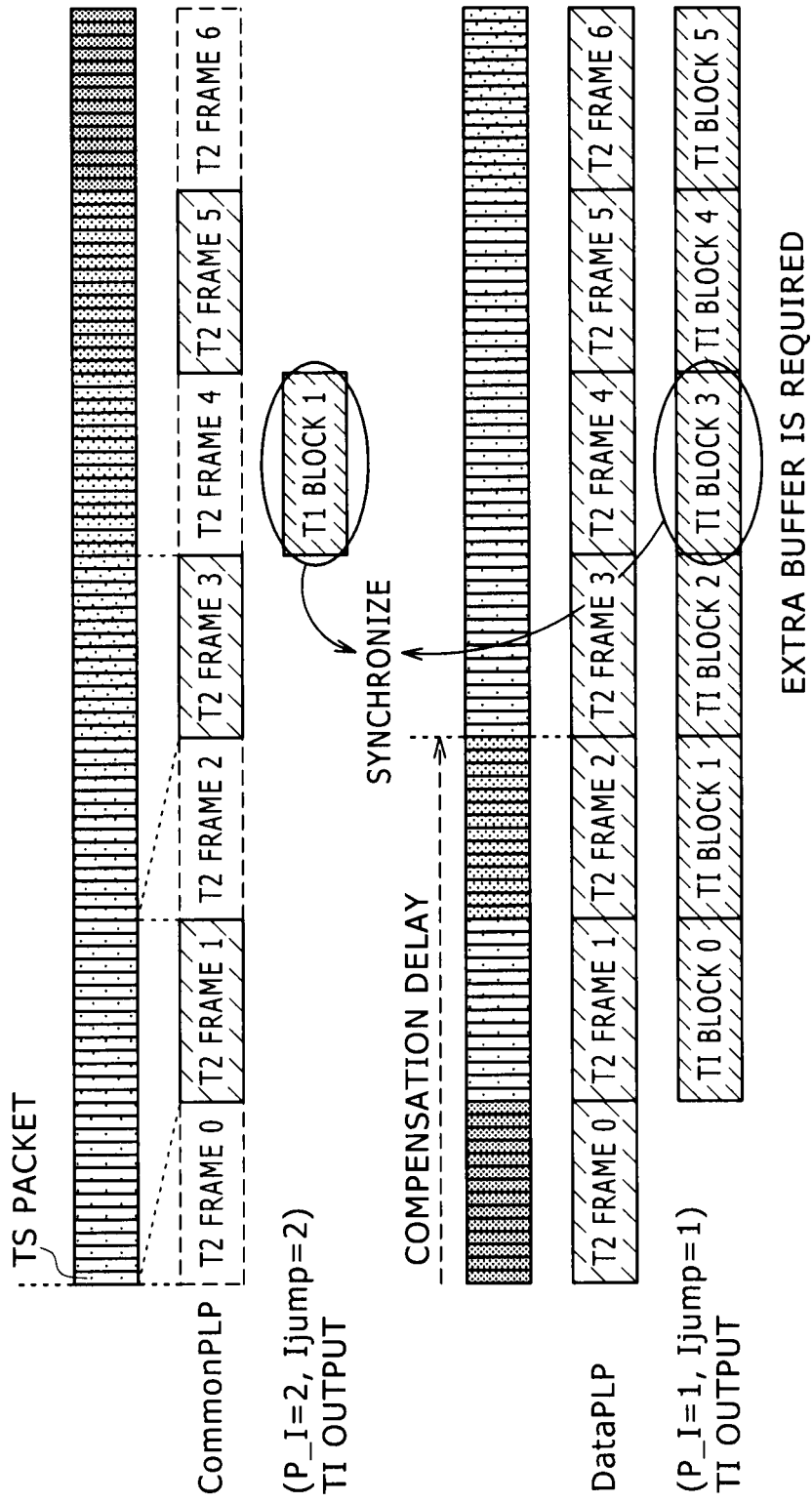
FIG. 14 is a diagrammatic view illustrating a method of synchronization in a case where compensation delay is valid.

It is to be noted that, in FIGS. 13 and 14, a manner in which TS packets of a Common PLP are mapped to T2 frames is illustrated on the upper side while a manner in which TS packets of a data PLP are mapped to T2 frames is illustrated on the lower side. Further, while, in FIGS. 13 and 14, only TS packets are illustrated in a unit of a T2 frame length, actually Null packets described hereinabove are included in addition to TS packets. Further, the direction of time is a direction from the left to the right in FIGS. 13 and 14. This relationship is similar also to several figures referred to in the description hereinafter given.

Further, in the examples of FIGS. 13 and 14, it is assumed that, as the specification information, the T2 frame number P_I=2 and the interval Ijump=2 are set for T2 frames of the Common PLP while the T2 frame number P_I=1 and the interval Ijump=1 is set for T2 frames of the Data PLP. Further, the error correction block 22 outputs a Common PLP and a Data PLP in a unit of a TI Block as described hereinabove, and the TI output corresponds to "TI input" in FIGS. 13 and 14. Accordingly, data corresponding to the "TI output" and the frame index F_i corresponding to the T2 frame in FIGS. 13 and 14 are inputted to the output I/F 23.

Referring to FIG. 13, since the T2 frame number P_I and the interval Ijump of the T2 frames of the Data PLP on the lower side in the figure are P_I=1 and Ijump=1, at a stage at which data inputting for one T2 frame is completed, the time deinterleaver 22A immediately starts TI outputting while time deinterleaving the data. In particular, if data for a T2 frame 0 are accumulated, then a TI block 0 is outputted, and also with regard to data for a T2 frame 1, a T2 frame 2, . . . , every time inputting of a T2 frame is completed, a TI Block 1, a TI Block 2, . . . are outputted.

On the other hand, since the T2 frame number P_I and the interval Ijump of the T2 frames of the Common PLP on the upper side in FIG. 13 are P_I=2 and Ijump=2, when the frame index F_i is F_i=3, that is, at a stage at which inputting of the T2 frame 3 is completed, data of a T1-block unit formed from two T2 frames including the T2 frame 1 and the T2 frame 3 are accumulated to permit outputting from the time deinterleaver 22A. As a result, a TI Block 1 formed from the T2 frame 1 and the T2 frame 3 is TI-outputted.

At this time, since the TI Block 0 of the Data PLP and the TI Block 1 of the Common PLP belong to a packet group in which it is necessary for them to be read out in synchronism with each other, that is, at the same timing, in order to synchronize the TI Blocks with each other, a buffer having a capacity for at least three T2 frames is necessary to delay the TI blocks of the Data PLP.

In other words, in the case where the compensation is invalid, in order to establish synchronism between T2 frames of the Common PLP and the Data PLP, a buffer for retaining data of a unit of a T2 frame is required.

On the other hand, in the case where the compensation delay is valid as seen in FIG. 14, TS packets of the Data PLP are delayed by a period of time corresponding to three T2 frames (4[T2 frames]−1[T2 frame]=3 [T2 frames]) by the transmission apparatus 2 side.

In this instance, the TI Block 3 of the Data PLP, that is, the T1 output of the T2 frame 3 (F_i=3) of the Data PLP, and the TI block 1 of the Common PLP, that is, the T1 output of the T2 frame 1 (F_i=1) and the T2 frame 3 (F_i=3) of the Common PLP, are TI-outputted in synchronism with each other. Further, those TI blocks are obtained from T2 frames which belong to a packet group which need be read out at the same timing.

In this manner, in the case where the compensation delay is valid, since T2 frames of one of PLPs are delayed by the transmission apparatus 2 side so as to establish synchronism between T2 frames of a Common PLP and a Data PLP, upon TI-outputting, the TI blocks are outputted in synchronism with each other. As a result, the necessity for such a buffer for delaying one of the T2 frames which is in an advancing state as described with reference to FIG. 13 is eliminated.

Figure 15:
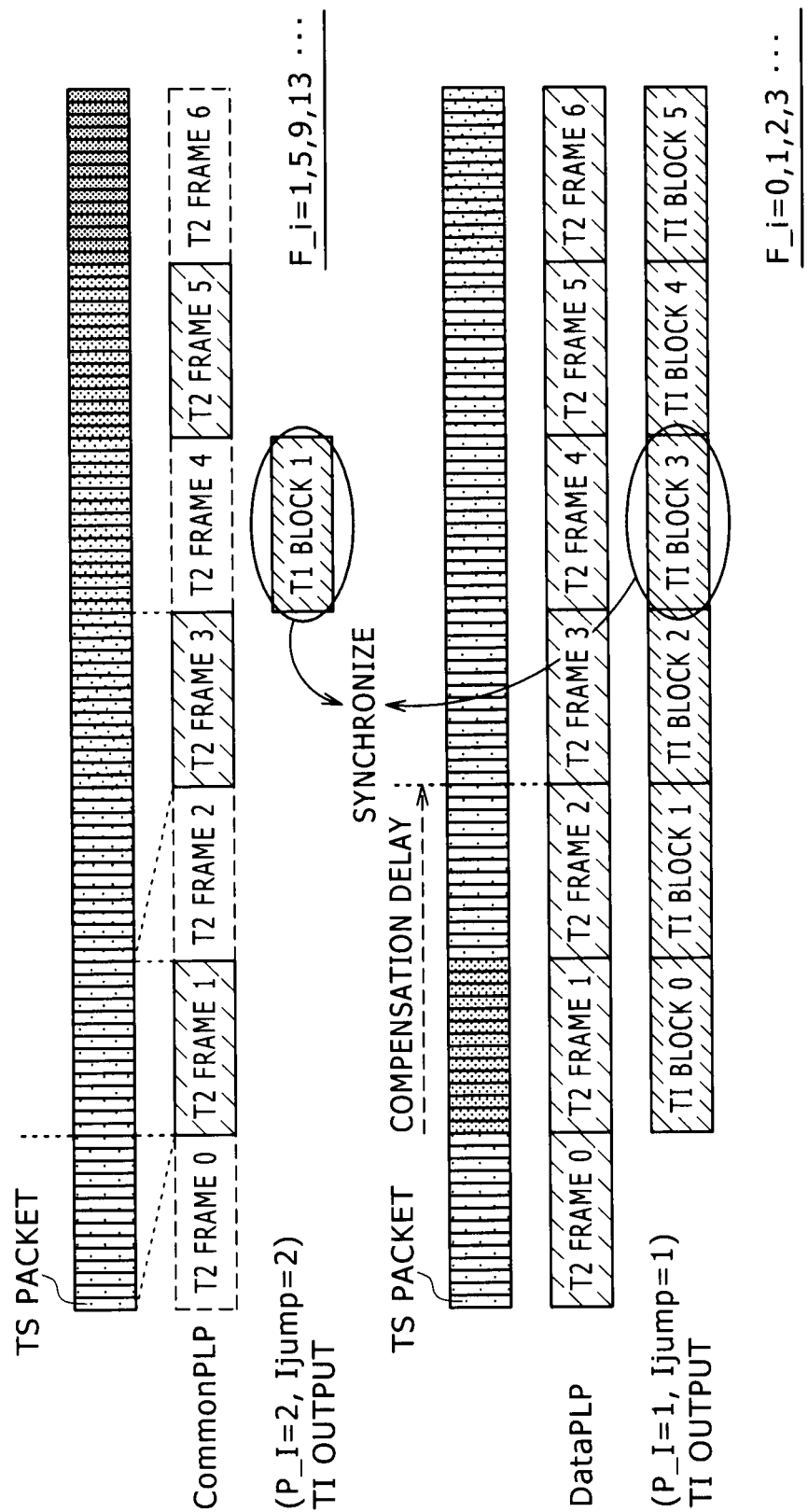
FIG. 15 is a diagrammatic view illustrating a TTO synchronism.

In the case where such a compensation delay is valid, as seen in FIG. 15, the TI block 1, . . . of the Common PLP and the TI block 0, TI Block 1, TI Block 2, TI Block 3, . . . of the Data PLP are successively inputted from the error correction block 22 to the output I/F 23, that is, to the synchronism detection portion 30. Further, at this time, since also the frame indices F_i allocated to the T2 frames of the PLPs are inputted, the synchronism detection portion 30 uses the specification information including the frame indices F_i, T2 frame numbers P_I and intervals Ijump to specify a combination of T2 frames which are in synchronism with each other.

In particular, when a combination of T2 frames of the Common PLP and the Data PLP having a frame index F_i with which the expression (3) given below is satisfied is specified, it is regarded that a Common PLP and a Data PLP which are in synchronism with each other are detected.

$$\{\text{floor}(F\_i\_\text{Common}/(P\_I \times I\_\text{jump})\_\text{Common}) + 1\} \times (P\_I \times I\_\text{jump})\_\text{Common} ==$$
$$\{\text{floor}(F\_i\_\text{Data}/(P\_I \times I\_\text{jump})\_\text{Data}) + 1\} \times (P\_I \times I\_\text{jump})\_\text{Data} \qquad (3)$$

It is to be noted that, in the expression (3), in the case where the T2 frame number P_I≠1, that is, in the case where one interleaving frame is configured from a plurality of T2 frames, that one of the frame indices F_i of the PLPs which has a comparatively low value is adopted. For example, in the case of the Common PLP of FIG. 15, since the T1 block 1 is formed from the T2 frame 1 and the T2 frame 3, the frame index F_i=1 which has a comparatively low value is adopted.

For example, while FIG. 15 illustrates a case in which T2 frames of the Common PLP and the Data PLP are in synchronism with the T2 frames 3, if the frame index F_i=1 (not F_i=3 but F_i=1 of the comparatively low value is adopted), T2 frame number P_I=2 and interval Ijump=2 of the Common PLP, and the frame index F_i=3, T2 frame number P_I=1 and interval Ijump=1 are substituted into the expression (3) given above, then the following expression is obtained.

Left side of expression (3)=floor(1/4+1)×4=4

Right side of expression (3)=floor(3/1+1)×1=4

Thus, when the frame indices F_i of the T2 frames of the Common PLP and the Data PLP are both equal to F_i=3, it can be regarded that the T2 frames 3 are in synchronism with each other. In other words, in the expression (3), when the last values of P_I×Ijump of the Common PLP and the Data PLP are equal to each other, it is regarded that the PLPs are in synchronism with each other.

Similarly, in the example of FIG. 15, when the frame index F_i of a T2 frame of the Common PLP is F_i=5, 9, 13, . . . , it satisfies the relationship of the expression (3) with F_i=7, 11, 15, . . . of a T2 frame of the Data PLP. Therefore, the common PLP and the Data PLP are synchronized with each other at the T2 frame 7, T2 frame 11, T2 frame 15, . . . .

After a combination of T2 frames of the Common PLP and the Data PLP which are in synchronism with each other is specified by the synchronism detection portion 30 in such a manner as described above, a TTO difference $\text{TTO}_{\textit{diff}}$ is determined from the TTOs added to the TS packets which configure the T2 frames which are in synchronism with each other. Then, the readout control portion 34 displaces the readout timings of the TS packets of the Common PLP and the Data PLP between them so that the TS packets of the Common PLP and the Data PLP which are synchronized with each other are read out.

Incidentally, if the TTO acquired from a TS packet of the Common PLP is represented by TTO_Common and the TTO acquired from a TS packet of the Data PLP is represented by TTO_Data, then the start point of the time of the TTO_Common and the start point of the time of the TTO_Data do not coincide with each other in some cases.

Figure 16:
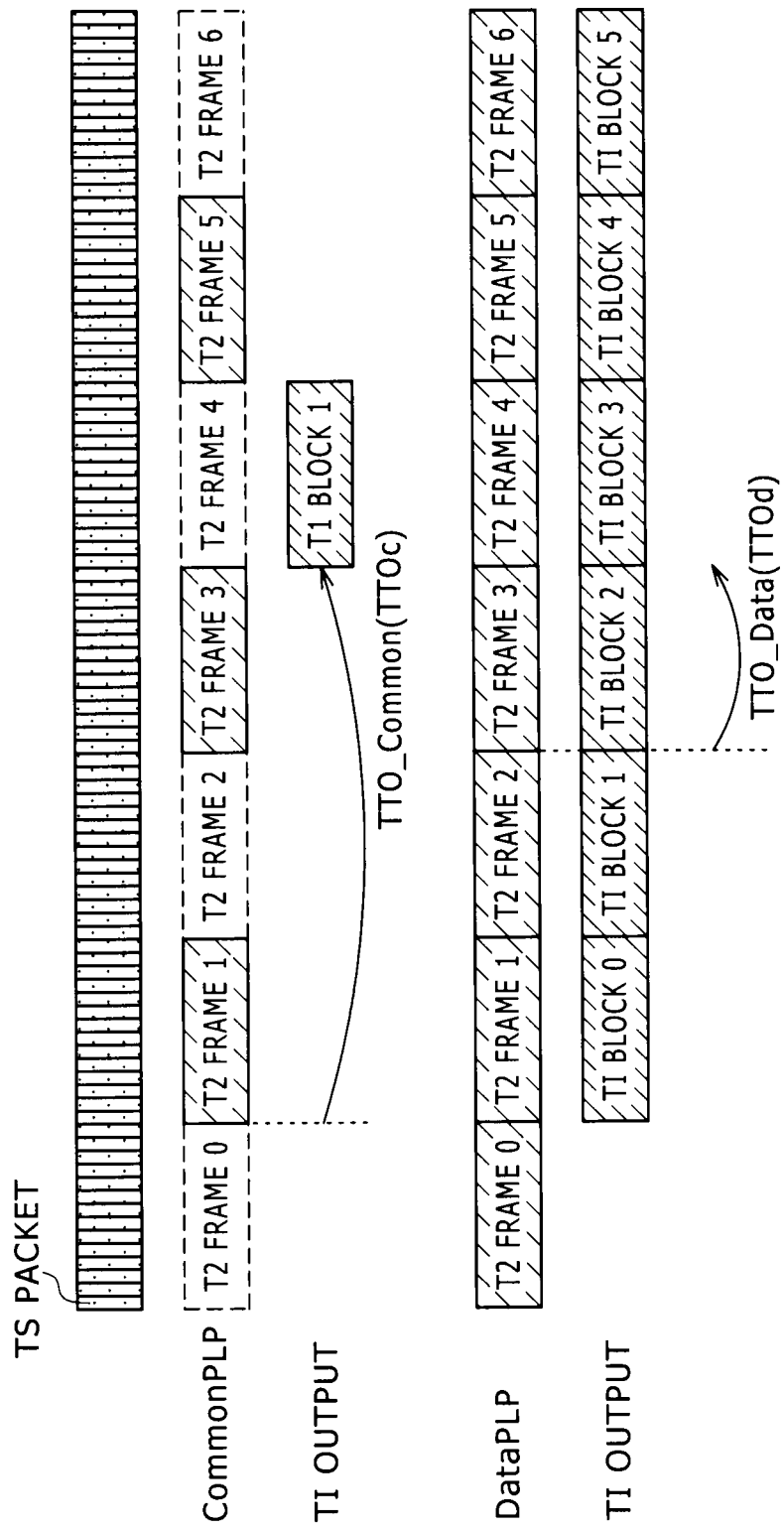
FIG. 16 is a similar view but illustrating a TTO synchronism in the case where frame indices are different from each other.

This displacement between the start points appears because the frame indices F_i of the T2 frames which are in synchronism with each other are different from each other. For example, in such a case in which the frame indices F_i of the T2 frames which are in synchronism with each other coincide with each other as illustrated in FIG. 11, the start points of the time of the TTOs of the T2 frames are same as each other. Therefore, if the difference between the values of the TTOs is merely used as it is, then synchronism between the TTOs can be established. On the other hand, as shown in FIG. 16, in such a case that the frame indices F_i of the T2 frames which are in synchronism each other are different from each other, the start point of the time of the TTO_Common and the start point of the time of the TTO_Data do not coincide with each other. Therefore, it is necessary to correct the displacement between the start points.

The TTO difference $\text{TTO}_{\textit{diff}}$ with such displacement between the start points corrected is determined by the following expression (4):

$$TTO_{\textit{diff}} = \text{TTO\_Common} - \qquad (4)$$
$$\{\text{TTO\_Data} + (F\_i\_\text{Data} - F\_i\_\text{Common}) \times T2\_\text{frame\_length}\}$$

where F_i Data is the value of the frame index F_i of the T2 frame of the Data PLP, and F_i_Common is the value of the frame index F_i of the T2 frame of the Common PLP. Further, T2_frame_length is the length of the T2 frame represented in a unit of T [us] and is one kind of the correction information described hereinabove. Thus, the correction process of the TTO difference $\text{TTO}_{\textit{diff}}$ of the expression (4) is executed by the $\text{TTO}_{\textit{diff}}$ correction unit 51.

In the expression (4), the T2 frame length T2_frame_length is added by an amount by which the difference between the frame indices F_i of the T2 frames of the TTO_Common and the TTO_Data to remove the compensation-delayed amount. In other words, according to the expression (4), the TTO difference $TTO_{diff}$ is determined after the displacement between the start points of the time of the TTO_Common and the TTO_Data is corrected.

Then, by displacing the readout timings of the TS packets of the Common PLP and the Data PLP by the TTO difference $TTO_{diff}$ determined in such a manner as described above, the TS packets of the Common PLP and the Data PL are outputted in synchronism with each other.

Consequently, even if the frame indices F_i of T2 frames which are in synchronism with each other are different from each other, it is possible to determine an accurate TTO difference $TTO_{diff}$ and establish synchronism between a Common PLP and a Data PLP with certainty.

Figure 17:
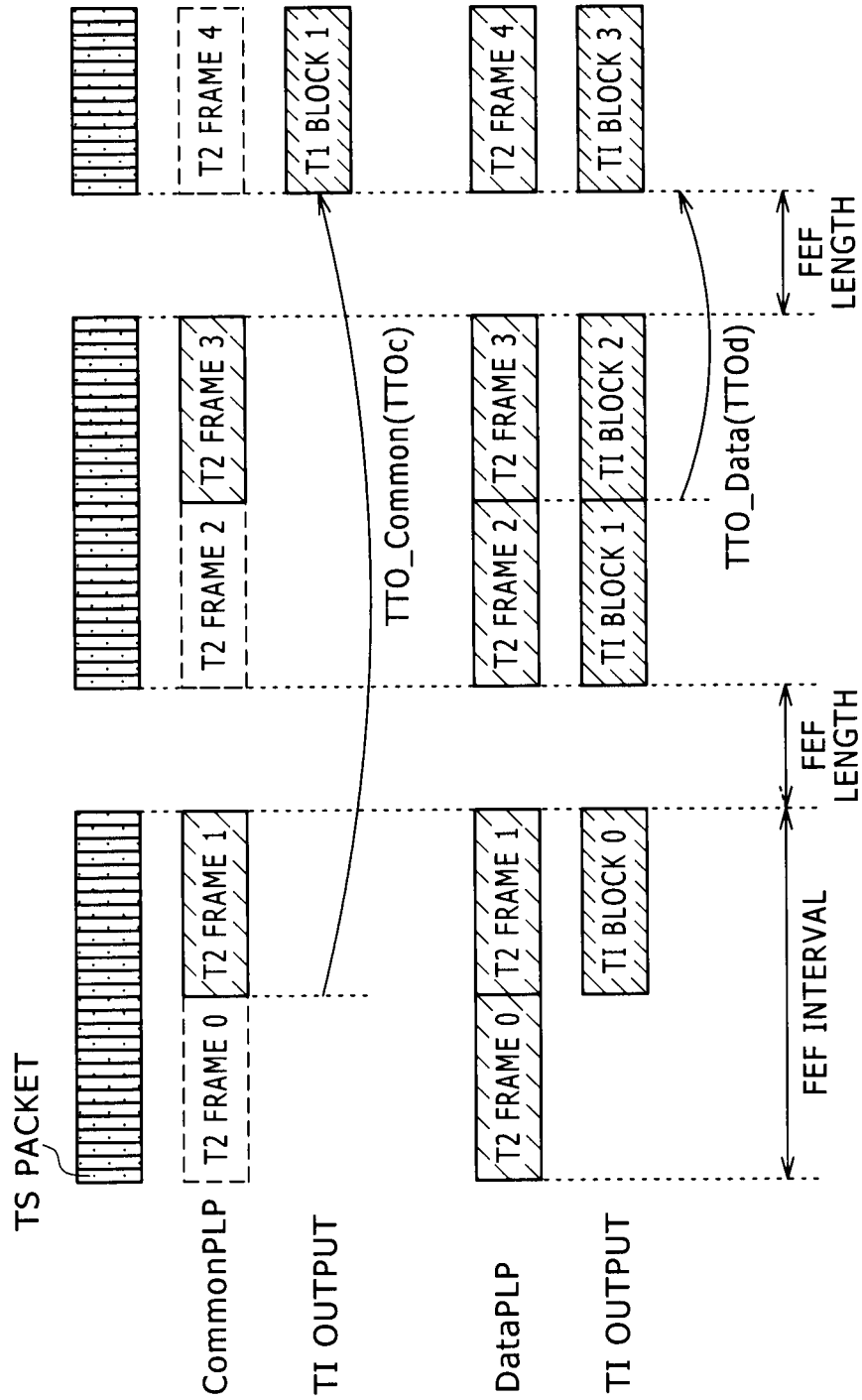
FIG. 17 is a diagrammatic view illustrating a TTO synchronism when an FEF is inserted in the case where frame indices are different from each other.

Meanwhile, in the case where an FEF which is a frame having a structure different from that of a T2 frame is inserted as seen in FIG. 17, also the length of the FEF is included in the compensation delay. Therefore, the start point of the time of the TTO_Common and the start point of the time of the TTO_Data are displaced from each other similarly as in the case of FIG. 16. In the example of FIG. 17, the FEF interval FEF_interval is FEF_interval=2, that is, an FEF of a predetermined length is disposed between the T2 frame 1 and the T2 frame 2 and between the T2 frame 3 and the T2 frame 4. In this instance, when the TTO difference $TTO_{diff}$ is to be determined, it is necessary to remove also the length of the FEFs.

The TTO difference $TTO_{diff}$ with such displacement between the start points by FEFs corrected is determined by the following expression (5):

$$TTO_{diff} = TTO\_Common - \\ [TTO\_Data + (F\_i\_Data - F\_i\_Common) \times T2\_frame\_length + \\ \{floor(F\_i\_Data/FEF\_interval) - \\ floor(F\_i\_Common/FEF\_interval)\} \times FEF\_length] \quad (5)$$

where FEF_length is the length of the FEF whose unit is T [us] and FEF_interval is the number of T2 frames inserted between FEFs, and they belong to the correction information described hereinabove. Specifically, the correction process of the TTO difference $TTO_{diff}$ in the expression (5) is carried out by the $TTO_{diff}$ correction unit 51.

According to the expression (5), not only the T2 frame length T2_frame_length but also the length FEF_length of FEFs inserted between T2 frames of frame indices F_i of T2 frames of the TTO_Common and the TTO_Data are added by an amount by which the frame indices F_i are different from each other to remove an amount corresponding to the compensation-delayed amount. In other words, it is considered that, in the expression (5), the TTO difference $TTO_{diff}$ is determined after the start points of the time of the TTO_Common and the TTO_Data are corrected.

Consequently, even if the frame indices F_i of T2 frames which are in synchronism with each other are different from each other and besides an FEF is inserted, it is possible to determine an accurate TTO difference $TTO_{diff}$ and establish synchronism between the Common PLP and the Data PLP with certainty.

TTO Synchronization Process

Now, a TTO synchronization process is described with reference to a flow chart of FIG. 18.

It is to be noted that, in the description given below with reference to FIG. 18, it is assumed that data in the form of an OFDM signal to be transmitted from the transmission apparatus 2 is transmitted in a state in which the compensation delay is valid.

First at step S11, the specification information acquisition unit 41 acquires T2 frame numbers P_I and intervals Ijump supplied thereto from the demodulation block 21. Then at step S12, the specification information acquisition unit 41 acquires frame indices F_i supplied thereto from the error correction block 22.

At step S13, the TTO synchronism detection unit 42 uses the specification information acquired from the specification information acquisition unit 41, that is, the T2 frame numbers P_I, intervals Ijump and frame indices F_i, to start detection of T2 frames which are in synchronism with each other.

In particular, the TTO synchronism detection unit 42 substitutes the acquired T2 frame numbers P_I, intervals Ijump and frame indices F_i into the expression (3) to specify a combination of the frame indices F_i which satisfy the relationship of the expression (3) at step S14. However, if the object frame indices F_i do not make T2 frames which are in synchronism with each other and the discrimination at step S14 is "No," then the processing returns to step S12.

Then, the processes at steps S12 to S14 are repeated to successively acquire the frame indices F_i of next T2 frames until T2 frames which are in synchronism with each other are detected. Then, the values of the frame indices F_i are successively substituted into the expression (3) to repeat the discrimination process of whether or not the relationship of the expression (3) is satisfied.

Then, if the relationship of the expression (3) is satisfied and it is decided at step S14 that T2 frames which are in synchronism each other are detected, then the readout control portion 34 acquires TTOs added to the TS packets of the Common PLP and the Data PLP which configure the T2 frames which are in synchronism each other at step S15.

At step S16, the TTO synchronism detection unit 42 discriminates whether or not the frame indices F_i of the T2 frames which are in synchronism each other coincide with each other. If it is decided at step S16 that the frame indices F_i coincide with each other, then since no displacement is exhibited between the start points of the time of the TTOs, the readout control portion 34 determines the TTO difference $TTO_{diff}$ from the difference between the acquired TTOs at step S21. In short, in this instance, the correction process of the TTO difference $TTO_{diff}$ by the $TTO_{diff}$ correction unit 51 is not carried out.

On the other hand, if it is decided at step S16 that the frame indices F_i are different from each other, then since it is necessary to carry out a correction process of the TTO difference $TTO_{diff}$, the $TTO_{diff}$ correction unit 51 acquires the correction information supplied thereto from the demodulation block 21 at step S17. This correction information is used to correct the TTO difference $TTO_{diff}$ such as, for example, the T2 frame length T2_frame_length, FEF length FEF_length or FEF interval FEF_interval as described hereinabove.

At step S18, the $TTO_{diff}$ correction unit 51 discriminates based on the acquired correction information whether or not an FEF is inserted in the T2 frames. If it is decided at step S18 that no FEF is inserted, then the $TTO_{diff}$ correction unit 51 corrects the displacement between the start points of the time of the TTO_Common and the TTO_Data by an amount corresponding to the difference between the frame indices F_i at step S19. Then, the $TTO_{diff}$ correction unit 51 determines the TTO difference $TTO_{diff}$ at step S21.

In particular, in this instance, the $TTO_{diff}$ correction unit 51 substitutes the values of the correction information including the TTO_Common, TTO_Data, F_i_data, F_i_Common and T2 frame length T2_frame_length into the expression (4) to determine the TTO difference $TTO_{diff}$ as described hereinabove with reference to FIG. 16.

On the other hand, if it is discriminated at step S17 that an FEF is inserted, then the $TTO_{diff}$ correction unit 51 corrects the displacement between the start points of the time of the TTO_Common and the TTO_Data by an amount corresponding to the difference between the frame index F_i and the inserted FEFs at step S20. Then, the $TTO_{diff}$ correction unit 51 determines the TTO difference $TTO_{diff}$ at step S21.

In particular, in this instance, the $TTO_{diff}$ correction unit 51 substitutes the values of the correction information including the TTO_Common, TTO_Data, F_i_data, F_i_Common, T2_frame_length T2 frame length, FEF interval FEF_interval and FEF length FEF_length into the expression (5) to determine the TTO difference $TTO_{diff}$ as described hereinabove with reference to FIG. 17.

In this manner, as a calculation method of the TTO difference $TTO_{diff}$, firstly a method which determines the TTO difference $TTO_{diff}$ without involving correction, secondly a method which determines the TTO difference $TTO_{diff}$ through the correction by the expression (4) and thirdly a method which determines the TTO difference $TTO_{diff}$ through the correction by the expression (5) are available. Thus, one of the first to third calculation methods is used to determine the TTO difference $TTO_{diff}$ depending upon the coincidence of the frame indices F_i and the presence or absence of an inserted FEF.

Then at step S22, the readout control portion 34 reads out the TS packets of the combination such that the readout timings of the TS packets of the Common PLP and the Data PLP are displaced by the TTO difference $TTO_{diff}$ determined by one of the first to third calculation methods to carry out TTO synchronization.

Figure 18:
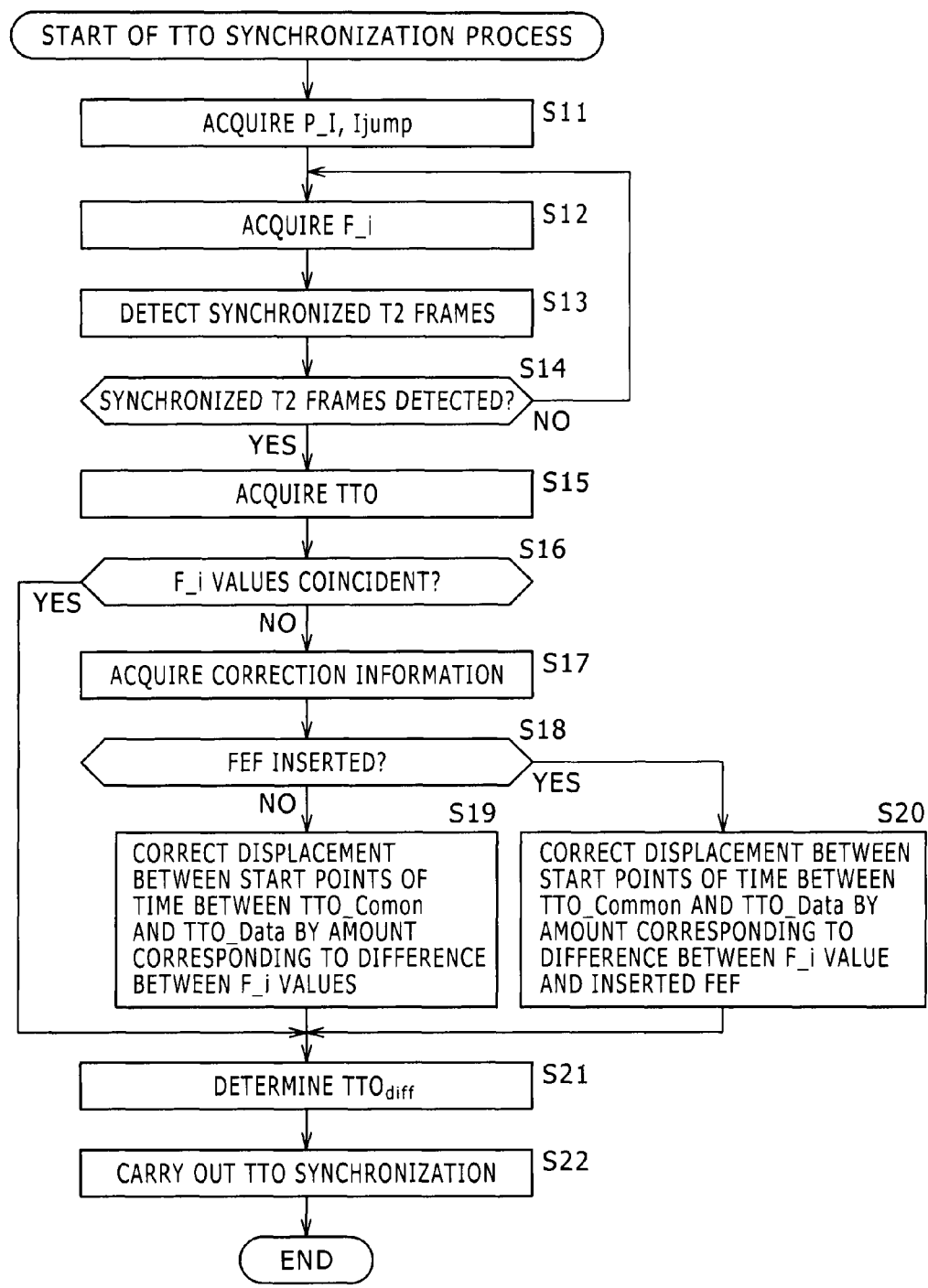
FIG. 18 is a flowchart illustrating a TTO synchronization process.

After the TTO synchronization is carried out and readout of the TS packets in accordance with the TTO synchronism is started by the readout control portion 34, the TTO synchronization process of FIG. 18 is ended.

As a combination of T2 frames configured from TS packets of a Common PLP and a Data PLP which are in synchronism each other is specified using specification information such as the frame index F_i, T2 frame number P_I and interval Ijump by the TTO synchronism detection unit 42 as described above, synchronism of TTOs added to the TS packets which configure the specified T2 frames is detected. Then, a TTO difference $TTO_{diff}$ obtained from the TTOs which are in synchronism each other is used to read out TS packets of the Common PLP and the Data PLP which are in synchronism with each other by the readout control portion 34. Consequently, even in the case where T2 frames in which a Common PLP and a Data PLP are inserted are not always fixed, a T2 frame in which a pertaining PLP is inserted can be specified. Consequently, synchronism between the Common PLP and the Data PLP can be established with certainty.

Further, since the displacement between the start points of the time of the TTO_Common and the TTO_Data is corrected by the $TTO_{diff}$ correction unit 51, even if the frame indices F_i of the T2 frames which are in synchronism each other are different from each other or even if an FEF is inserted, an accurate TTO difference $TTO_{diff}$ is determined. Consequently, synchronism between the Common PLP and the Data PLP can be established with certainty.

Example of the Configuration of the Reception System

Now, a configuration of the reception system is described with reference to FIGS. 19 to 21.

Figure 19:
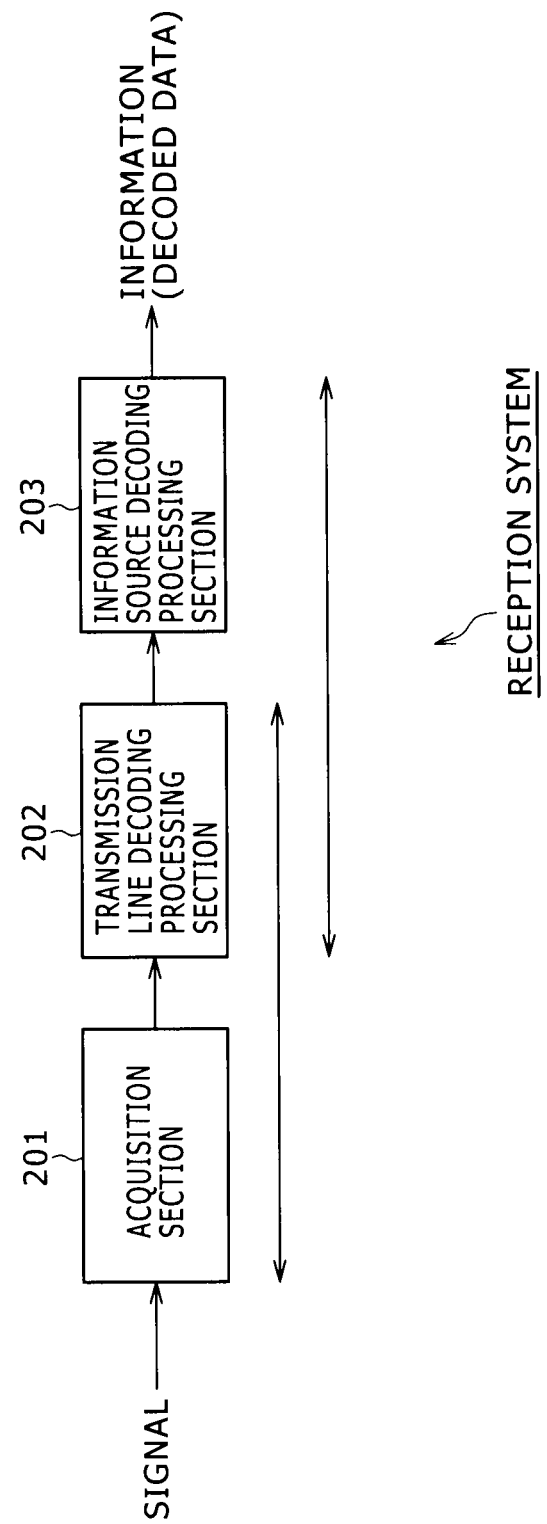
FIGS. 19, 20 and 21 are block diagrams showing different reception systems to which the present invention is applied.

FIG. 19 shows an example of a configuration of a first mode of a reception system to which the present invention is applied.

Referring to FIG. 15, the reception system includes an acquisition section 201, a transmission line decoding processing section 202 and an information source decoding processing section 203.

The acquisition section 201 acquires an OFDM signal of the M-PLP system of DVB-T2 through a transmission line such as, for example, terrestrial digital broadcasting, satellite broadcasting, a CATV (Cable Television) network, the Internet or some other network not shown. The acquisition section 201 supplies the acquired OFDM signal to the transmission line decoding processing section 202.

If the OFDM signal is broadcast, for example, from a broadcasting station through a ground wave, a satellite wave, a CATV network or the like, then the acquisition section 201 is configured from a tuner, an STB or the like similarly to the acquisition section 12 shown in FIG. 2. On the other hand, if the OFDM signal is transmitted, for example, from a WEB server by multicast as in the case of IPTV (Internet Protocol Television), the acquisition section 201 is configured from a network I/F such as, for example, an NIC (Network Interface Card).

If the OFDM signal is broadcast, for example, from a broadcasting station through a ground wave, a satellite wave, a CATV network or the like, then, for example, a plurality of OFDM signals transmitted from a plurality of transmission apparatus through a plurality of transmission lines are received by the acquisition section 201. As a result, the plural OFDM signals are received as a combined single OFDM signal.

The transmission line decoding processing section 202 carries out a transmission line decoding process including at least a process of decoding PLPs from an OFDM signal acquired by the acquisition section 201 through a transmission line. Then, the transmission line decoding processing section 202 supplies a signal obtained by the transmission line decoding process to the information source decoding processing section 203.

In particular, since an OFDM signal by the M-PLP system is defined by a plurality of Data PLPs configured from packets which remain when a packet common to all of a plurality of TSs is extracted from each of the TSs and a Common PLP configured from the common packet, the transmission line decoding processing section 202 carries out, for example, a process of decoding PLPs (packet sequence) for the OFDM signal and outputs a resulting signal.

Further, the OFDM signal acquired by the acquisition section 201 through a transmission line is in a state distorted by an influence of a transmission line characteristic, and the transmission line decoding processing section 202 carries out a decoding process including, for example, transmission line estimation, channel estimation, phase estimation and so forth for such OFDM signal.

Further, the transmission line decoding process includes a process of correcting errors caused by the transmission line and so forth. For example, as error correction coding, LDPC code, Reed Solomon coding and so forth are available.

The information source decoding processing section 203 carries out an information source decoding process including at least a process of decompressing compressed information into original information for the signal for which the transmission line decoding process has been carried out.

In particular, the OFDM signal acquired by the acquisition section 201 through a transmission line is sometimes in a state in which compression coding for compressing information in order to reduce the data amount of images, sound and so forth as information is applied. In this instance, the information source decoding processing section 203 carries out an information source decoding process such as a process of decompressing the compressed information into original information and so forth for the signal to which the transmission line decoding process has been carried out.

It is to be noted that, if the OFDM signal acquired by the acquisition section 201 through the transmission line is not in a compression coded form, then the information source decoding processing section 203 does not carry out the process of decompressing compressed information into original information.

Here, the decompression process may be, for example, MPEG decoding. Further, the transmission line decoding process sometimes includes descrambling and so forth in addition to the decompression process.

In the reception system configured in such a manner as described above, the acquisition section 201 acquires, through the transmission line, an OFDM signal according to the M-PLP system obtained by applying compression coding such as MPEG coding and further applying error correction coding for data, for example, of an image and sound. The acquisition section 201 supplies the acquired OFDM signal to the transmission line decoding processing section 202. It is to be noted that, at this time, the OFDM signal is acquired in a state distorted by an influence of a transmission line characteristic.

The transmission line decoding processing section 202 carries out a process similar to that of the transmission line decoding processing section 13 shown in FIG. 2 as a transmission line decoding process for the OFDM signal from the acquisition section 201. The transmission line decoding processing section 202 supplies a signal obtained as a result of the transmission line decoding process to the information source decoding processing section 203.

The information source decoding processing section 203 carries out a process similar to that of the decoder 14 shown in FIG. 2 as an information source decoding process for the signal from the transmission line decoding processing section 202. The information source decoding processing section 203 outputs an image or sound obtained as a result of the information source decoding process.

Such a reception system of FIG. 19 as described above can be applied, for example, to a television tuner or the like which receives television broadcasting as digital broadcasting.

It is to be noted that the acquisition section 201, transmission line decoding processing section 202 and information source decoding processing section 203 can each be configured as a single independent apparatus or hardware apparatus such as an IC (Integrated Circuit) or a software module.

Further, the acquisition section 201, transmission line decoding processing section 202 and information source decoding processing section 203 can be configured in different manners. For example, a set of the acquisition section 201 and the transmission line decoding processing section 202, a set of the transmission line decoding processing section 202 and the information source decoding processing section 203 or a set of the acquisition section 201, the transmission line decoding processing section 202, and information source decoding processing section 203 can be configured as a single independent apparatus.

Figure 20:
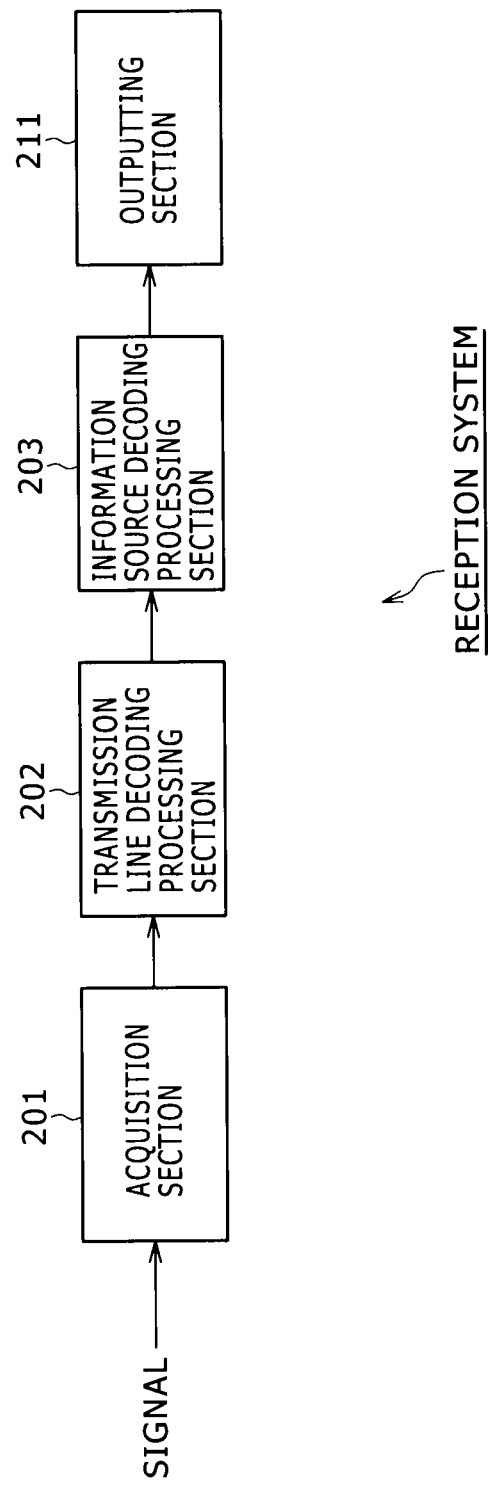

FIG. 20 shows an example of a configuration of a second mode of the reception system to which the present invention is applied.

The reception system shown in FIG. 20 includes common components to those of the reception system described hereinabove with reference to FIG. 19, and overlapping description of the common components is omitted herein to avoid redundancy.

Referring to FIG. 20, the reception system shown is common to the reception system described hereinabove with reference to FIG. 19 in that it includes an acquisition section 201, a transmission line decoding processing section 202 and an information source decoding processing section 203 but is different from the reception system of FIG. 19 in that it additionally includes an outputting section 211.

The outputting section 211 may be, for example, a display apparatus for displaying an image and/or a speaker for outputting sound, and outputs an image, sound or the like as a signal outputted from the information source decoding processing section 203. In other words, the outputting section 211 displays an image and/or outputs sound.

Such a reception system of FIG. 20 as described above can be applied, for example, to a television set for receiving television broadcasting as digital broadcasting, a radio receiver for receiving radio broadcasting and so forth.

It is to be noted that, if the OFDM signal acquired by the acquisition section 201 is not in a compression coded state, then a signal outputted from the transmission line decoding processing section 202 is supplied to the outputting section 211.

Figure 21:
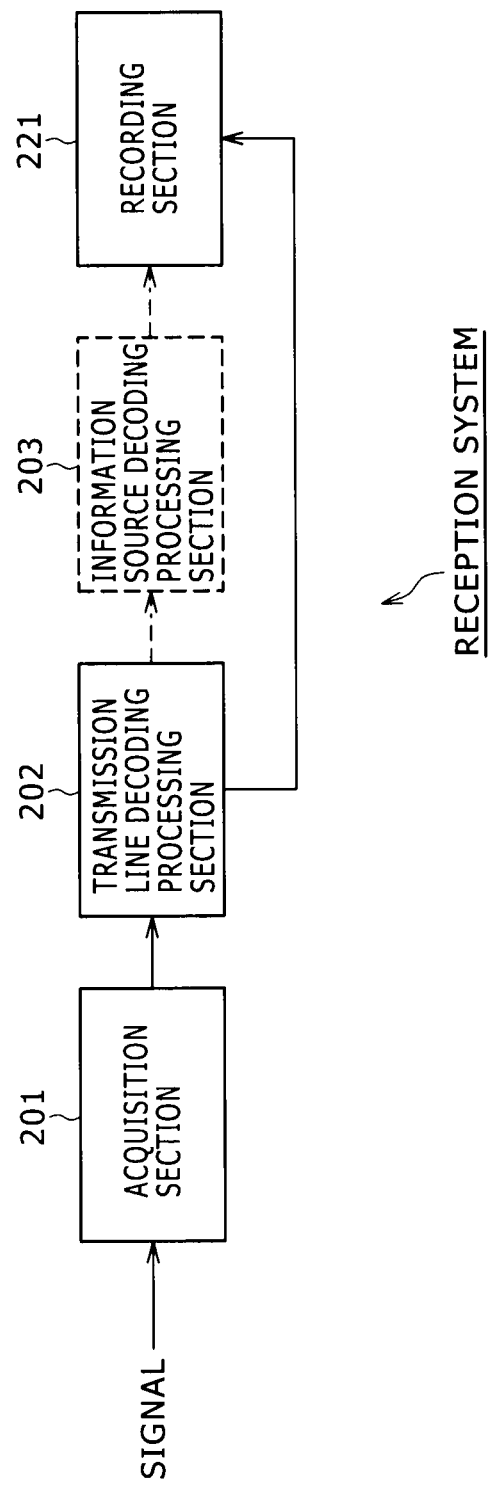

FIG. 21 shows an example of a configuration of a third mode of the reception system to which the present invention is applied.

The reception system shown in FIG. 21 includes common components to those of the reception system described hereinabove with reference to FIG. 19, and overlapping description of the common components is omitted herein to avoid redundancy.

Referring to FIG. 21, the reception system shown is similar to that of FIG. 19 in that it includes an acquisition section 201 and a transmission line decoding processing section 202.

It is to be noted, however, that the reception system of FIG. 21 is different from that of FIG. 19 in that it does not include the information source decoding processing section 203 but includes a recording section 221.

The recording section 221 records a signal outputted from the transmission line decoding processing section 202, for example, a TS packet of a TS of MPEG, in a recording (storage) medium such as an optical disk, a hard disk (magnetic disk) or a flash memory.

The reception system of FIG. 21 having such a configuration as described above can be applied to a recorder for recording a television broadcast or the like.

It is to be noted that the reception system of FIG. 21 may additionally include the information source decoding processing section 203 such that a signal after an information source decoding process is applied by the information source decoding processing section 203, that is, an image or sound obtained by decoding, can be recorded by the recording section 221.

Computer to which the Invention is Described

Incidentally, while the series of processes described above can be executed by hardware, it may otherwise be executed by software. Where the series of processes is executed by software, a program which constructs the software is installed into a computer. The computer in this instance includes a computer incorporated in hardware for exclusive use, a personal computer for universal use which can execute various functions by installing various programs, and so forth.

FIG. 22 shows an example of a hardware configuration of a computer which executes the series of processes described hereinabove in accordance with a program.

Referring to FIG. 22, in the computer shown, a central processing unit (CPU) 401, a read only memory (ROM) 402 and a random access memory (RAM) 403 are connected to one another by a bus 404.

Further, an input/output interface 405 is connected to the bus 404. An inputting section 406, an outputting section 407, a storage section 408 and a communication section 409 and a drive 410 are connected to the input/output interface 405.

The inputting section 406 includes a keyboard, a mouse, a microphone and so forth. The outputting section 407 includes a display unit, a speaker and so forth. The storage section 408 includes a hard disk, a nonvolatile memory or the like. The communication section 409 includes a network interface or the like. The drive 410 drives a removable medium 411 such as a magnetic disk, an optical disk, a magneto-optical disk or a semiconductor memory.

In the computer configured in such a manner as described above, the CPU 401 loads a program stored, for example, in the storage section 408 into the RAM 403 through the input/output interface 405 and the bus 404 and executes the program to carry out the series of processes described above.

The program to be executed by the computer, particularly by the CPU 401, can be recorded on and provided as a removable medium 411, for example, as a package medium or the like. Further, the program can be provided through a wire or wireless transmission medium such as a local area network, the Internet or a digital broadcast.

In the computer, the program can be installed into the storage section 408 through the input/output interface 405 by loading the removable medium 411 into the drive 410. Further, the program can be received by the communication section 409 through a wire or wireless transmission medium and installed into the storage section 408. Or, the program may be installed in advance in the ROM 402 or the storage section 408.

It is to be noted that, in the present specification, the steps which describe the program recorded in or on a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-000920 filed in the Japan Patent Office on Jan. 6, 2010, the entire content of which is hereby incorporated by reference.

What is claimed is:

1. A reception apparatus, comprising:
   circuitry configured to:
   receive an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;
   acquire specification information for specifying a combination of the first frame and the second frame, which are in synchronism with each other, obtained by demodulating the received OFDM signal; and
   detect a combination of a packet of the common packet sequence which configures the first frame and a packet of the data packet sequence which configures the second frame, whose combination is specified based on the acquired specification information.

2. The reception apparatus according to claim 1, wherein the specification information includes information representative of the numbers of first frames and second frames with respect to a predetermined frame which serves as a reference and information representative of a distance at which such common packet sequences are inserted in the first frame and information representative of a distance at which such data packet sequences are inserted in the second frame; and
   said circuitry is configured to specify a first frame and a second frame which make a combination in accordance with the information representative of the numbers and the distance.

3. The reception apparatus according to claim 2, wherein the circuitry is further configured to read out the packets of the common packet sequence and the data packet sequence which are in synchronism each other using difference information which is a difference of the information added to the packets which configure the first frame and the second frame specified and indicative of timings at which the packets are to be read out.

4. The reception apparatus according to claim 3, wherein the specification information includes information indicative of a frame index allocated to each of the first frame and the second frame, and
   said circuitry is configured to correct, in the case where the pieces of the information indicative of the frame indices of the first frame and the second frame are different from each other, the difference information in response to frame lengths indicative of the lengths of the first frame and the second frame.

5. The reception apparatus according to claim 3, wherein the specification information includes information indicative of frame indices allocated to the first frame and second frame, and
   said circuitry is configured to correct, in the case where the pieces of the information indicative of the frame indices of the first frame and the second frame are different from each other and a third frame having a structure different from that of the first frame and the second frame is inserted, the difference information in response to a first frame length indicative of the length of the first frame and the second frame, a second frame length indicative of the length of the third frame, and a distance at which the third frames are disposed.

6. The reception apparatus according to claim 1, wherein the common packet sequence and the data packet sequence are Common PLP(Physical Layer Pipe)s and Data PLP (Physical Layer Pipe)s, respectively, produced from a plurality of streams in accordance with the M-PLP (Multiple PLP (Physical Layer Pipe)) system of DVB-T (Digital Video Broadcasting-Terrestrial)2.

7. A reception method, comprising the steps, carried out by a reception apparatus, of:
   receiving an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;

acquiring specification information for specifying a combination of the first frame and the second frame, which are in synchronism with each other, obtained by demodulating the received OFDM signal; and detecting a combination of a packet of the common packet sequence which configures the first frame and a packet of the data packet sequence which configures the second frame, whose combination is specified based on the acquired specification information.

8. A non-transitory computer-readable medium including a program for causing a computer to:

receive an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;

acquire specification information for specifying a combination of the first frame and the second frame, which are in synchronism with each other, obtained by demodulating the received OFDM signal; and detect a combination of a packet of the common packet sequence which configures the first frame and a packet of the data packet sequence which configures the second frame, whose combination is specified based on the acquired specification information.

9. A reception system, comprising:

an interface configured to acquire, through a transmission line, an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams; and circuitry configured to carry out a transmission line decoding process including at least a decoding process of the packet sequences for the OFDM signal acquired through the transmission line;

said circuitry configured to acquire specification information for specifying a combination of the first frame and the second frame, which are in synchronism with each other, obtained by demodulating the OFDM signal acquired through the transmission line, and detect a combination of a packet of the common packet sequence which configures the first frame and a packet of the data packet sequence which configures the second frame, whose combination is specified based on the acquired specification information.

10. A reception system, comprising:

a transmission line decoding processing section adapted to carry out a transmission line decoding process including at least a decoding process of packet sequences for an OFDM (Orthogonal Frequency Division Multiplexing) signal acquired through a transmission line and obtained by modulating a first frame configured so as to include packets of a common packet sequence configured from a packet common to a plurality of streams and a second frame configured so as to include packets of a data packet sequence configured from packets individually unique to the plural streams; and an information source decoding processing section adapted to carry out, for the signal for which the transmission line decoding process is carried out, an information source decoding process including at least a process of decompressing compressed information into original information;

said transmission line decoding processing section including circuitry configured to acquire specification information for specifying a combination of the first frame and the second frame, which are in synchronism with each other, obtained by demodulating the OFDM signal acquired through the transmission line, and detect a combination of a packet of the common packet sequence which configures the first frame and a packet of the data packet sequence which configures the second frame, whose combination is specified based on the acquired specification information.

11. A reception system, comprising:

a transmission line decoding processing section adapted to carry out a transmission line decoding process including at least a decoding process of packet sequences for an OFDM (Orthogonal Frequency Division Multiplexing) signal acquired through a transmission line and obtained by modulating a first frame configured so as to include packets of a common packet sequence configured from a packet common to a plurality of streams and a second frame configured so as to include packets of a data packet sequence configured from packets individually unique to the plural streams; and an outputting section adapted to output an image or sound based on the signal for which the transmission line decoding process is carried out;

said transmission line decoding processing section including circuitry configured to acquire specification information for specifying a combination of the first frame and the second frame, which are in synchronism with each other, obtained by demodulating the OFDM signal acquired through the transmission line, and detect a combination of a packet of the common packet sequence which configures the first frame and a packet of the data packet sequence which configures the second frame, whose combination is specified based on the acquired specification information.

12. A reception system, comprising:

a transmission line decoding processing section adapted to carry out a transmission line decoding process including at least a decoding process of packet sequences for an OFDM (Orthogonal Frequency Division Multiplexing) signal acquired through a transmission line and obtained by modulating a first frame configured so as to include packets of a common packet sequence configured from a packet common to a plurality of streams and a second frame configured so as to include packets of a data packet sequence configured from packets individually unique to the plural streams; and a recording section adapted to record the signal for which the transmission line decoding process is carried out;

said transmission line decoding processing section including circuitry configured to acquire specification information for specifying a combination of the first frame and the second frame, which are in synchronism with each other, obtained by demodulating the OFDM signal acquired through the transmission line, and detect a combination of a packet of the common packet sequence which configures the first frame and a packet of the data packet sequence which configures the second frame, whose combination is specified based on the acquired specification information.

13. A reception apparatus, comprising:

means for receiving an OFDM (Orthogonal Frequency Division Multiplexing) signal obtained by modulating a first frame configured so as to include packets of a common packet sequence configured from a packet common to a plurality of streams and a second frame configured so as to include packets of a data packet sequence configured from packets individually unique to the plural streams;

means for acquiring specification information for specifying a combination of the first frame and the second frame, which are in synchronism with each other, obtained by demodulating the received OFDM signal; and means for detecting a combination of a packet of the common packet sequence which configures the first frame and a packet of the data packet sequence which configures the second frame, whose combination is specified based on the acquired specification information.

* * * * *